(12) United States Patent
Kuroda et al.

(10) Patent No.: US 12,509,434 B2
(45) Date of Patent: Dec. 30, 2025

(54) OPTICALLY RESOLVED TROLOX INTERMEDIATE AND METHOD FOR PRODUCING SAME

(71) Applicant: PTC THERAPEUTICS, INC., Warren, NJ (US)

(72) Inventors: Kiichi Kuroda, Osaka (JP); Kiyoto Sawamura, Osaka (JP); Shinjiro Tsuyumine, Osaka (JP)

(73) Assignee: PTC THERAPEUTICS, INC., Warren, NJ (US)

( * ) Notice: Subject to any disclaimer, the term of this patent is extended or adjusted under 35 U.S.C. 154(b) by 801 days.

(21) Appl. No.: 17/801,237

(22) PCT Filed: Feb. 19, 2021

(86) PCT No.: PCT/JP2021/006465
§ 371 (c)(1),
(2) Date: Aug. 19, 2022

(87) PCT Pub. No.: WO2021/167095
PCT Pub. Date: Aug. 26, 2021

(65) Prior Publication Data
US 2023/0029044 A1 Jan. 26, 2023

(30) Foreign Application Priority Data
Feb. 21, 2020 (JP) .................. 2020-028614

(51) Int. Cl.
*C07D 311/66* (2006.01)
(52) U.S. Cl.
CPC ................. *C07D 311/66* (2013.01)
(58) Field of Classification Search
CPC .................................................... C07D 311/66
USPC ........................................................ 549/405
See application file for complete search history.

(56) References Cited

U.S. PATENT DOCUMENTS

| 3,947,473 A | 3/1976 | Scott et al. |
| 4,003,919 A | 1/1977 | Scott et al. |
| 4,026,907 A | 5/1977 | Scott et al. |
| 2011/0251407 A1 | 10/2011 | Kyuuko |

FOREIGN PATENT DOCUMENTS

| CN | 103702981 A | 4/2014 |
| CN | 105164105 A | 12/2015 |
| EP | 2351729 A1 | 8/2011 |
| EP | 2985277 A1 | 2/2016 |
| GB | 1456827 A | 11/1976 |
| GB | 1456828 A | 11/1976 |
| JP | 2002-167381 A | 6/2002 |
| JP | 2012-25705 A | 2/2012 |
| WO | WO 2002/12221 A1 | 2/2002 |
| WO | WO 2010/052475 A1 | 5/2010 |
| WO | WO 2009/061744 A2 | 1/2011 |
| WO | WO 2016/100576 A9 | 6/2016 |
| WO | WO 2016/100579 A1 | 6/2016 |

OTHER PUBLICATIONS

Shang Suicun, "Organic Chemistry Experimental Operations and Techniques", Xi'an Map Publishing House, p. 82, Jan. 8, 1996.
International Search Report of PCT/JP2021/006465 dated Apr. 6, 2021 and its English translation; 9 pages.
English translation of Written Opinion of PCT/JP2021/006465 mailed Apr. 6, 2021; 5 pages.
Separation of optical isomers [quarterly chemistry review No. 6], Society Publishing Center Co., Ltd., 2 exploration experiment, 3 factors that make the division unsuccessful, 5 about solvent; Jun. 10, 1999, pp. 45-54; together with unofficial translation.
Office Action for BR Patent Application N°. BR112022016508-0 dated May 7, 2025, along with its English translation; 5 pages.
Extended European Search Report for EP 21757166 dated Apr. 24, 2024; 12 pages.

(Continued)

*Primary Examiner* — Kristin A Vajda
(74) *Attorney, Agent, or Firm* — Squire Patton Boggs (US) LLP

(57) ABSTRACT

The present invention provides a method for chiral resolution of Trolox. The present disclosure relates to a method for producing a solid salt of a compound of formula I, wherein an amide-based solvent is added to a sample, which contains a compound of formula I, while being assumed to contain a compound of formula II, in the presence of an optical resolution agent:

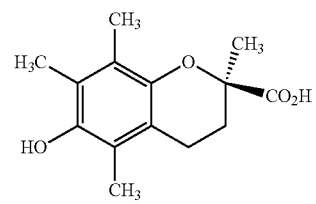

Formula I: (R)-6-hydroxy-2, 5, 7, 8-tetramethylchroman-2-carboxylic acid (hereinafter referred to R Trolox)

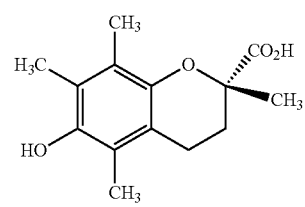

Formula II: (S)-6-hydroxy-2, 5, 7, 8-tetramethylchroman-2-carboxylic acid (hereinafter referred to S Trolox).

56 Claims, 3 Drawing Sheets

(56) References Cited

OTHER PUBLICATIONS

Ackland et al., "Synthesis of Carbon-14 and Carbon-13 labelled (R)-(-)-2114-(2,6-d1-1-pyrrolidiny1-4-pyrimidinyl)-1-piperazinyllmethy11-3,4-d1hydro-2,5,7,8-tetramethyl-2H-1-benzopyran-6-ol", Journal of Labelled Compounds and Radiopharmaceuticals, vol. 33, No. 1, 1993, pp. 45-60, XP93120336; DOI: 10.1002/jlcr.2580330107.
Supplemental Partial European Search Report for EP 21757166 dated Jan. 17, 2024; 6 pages.
Office Action of Chinese Patent Application No. 202180015723.7 dated Sep. 21, 2023, and its English translation; 16 pages.

OPTICALLY RESOLVED TROLOX INTERMEDIATE AND METHOD FOR PRODUCING SAME

TECHNICAL FIELD

The present application provides a method for chiral resolution of Trolox. The present application also provides a composition and method for optically resolving a compound, comprising an amide-based solvent.

BACKGROUND ART

International Publication No. WO 2009/061744 describes that racemic 2-hydroxy-2-methyl-4-(2,4,5-trimethyl-3,6-dioxocyclohexa-1,4-dienyl)butanamide, which is useful in treating and/or suppressing a mitochondrial disorder and a specific pervasive developmental disorder, is synthesized from racemic Trolox (6-hydroxy-2,5,7,8-tetramethylchroman-2-carboxylic acid).

A chiral resolving agent can be useful for separating enantiomers. For example, a chiral resolving agent can form a solid salt with one of the enantiomers, but not the other enantiomer (remains in a solution or as an oil). Accordingly, these two enantiomers can be separated by filtering a solid. However, not all resolving agents are useful for separating enantiomers of a specific compound. Furthermore, resolving agents vary, for example, in their ability to provide better resolution, higher yield, simpler scale-up, and/or improved usability.

Racemic Trolox has been resolved into (R)- and (S)-isomers by using α-methylbenzylamine (MBA) and R-(+)-N-benzyl-α-phenylethylamine resolving agents up to this point. See for example U.S. Pat. Nos. 3,947,473, 4,003,919, and 4,026,907, and US Patent Application Publication No. 2011/0251407.

CITATION LIST

Patent Literature

[PTL 1] International Publication No. WO 2009/061744
[PTL 2] U.S. Pat. No. 3,947,473
[PTL 3] U.S. Pat. No. 4,003,919
[PTL 4] U.S. Pat. No. 4,026,907
[PTL 5] US Patent Application Publication No. 2011/0251407

SUMMARY OF INVENTION

Solution to Problem

The inventors have completed the present disclosure by finding a method of optically resolving Trolox stably as a result of diligent study. The present application has also found that an amide-based solvent is useful for optically resolving a compound.

For example, the present disclosure provides the following items.
(Item 1)
A method of manufacturing a solid salt of a compound of formula I, comprising adding an amide-based solvent in the presence of an optical resolving agent to a sample comprising the compound of formula I and suspected of comprising a compound of formula II:

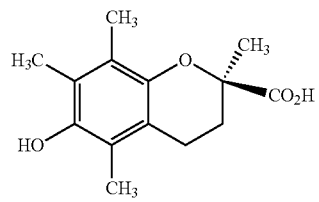

Formula I: (R)-6-hydroxy-2,5,7,8-tetramethylchroman-2-carboxylic acid (hereinafter R Trolox)

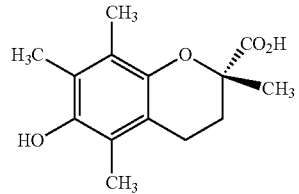

Formula II: (S)-6-hydroxy-2,5,7,8-tetramethylchroman-2-carboxylic acid (hereinafter S Trolox).
(Item 2)
The method of item 1, wherein the optical resolving agent comprises at least an asymmetric carbon, and a moiety that can form a salt with the R Trolox and S Trolox.
(Item 3)
The method of item 1 or 2, comprising adding the optical resolving agent to the sample.
(Item 4)
The method of any one of items 1 to 3, wherein addition of the amide-based solvent comprises adding a mixture of the optical resolving agent and the amide-based solvent to the sample.
(Item 5)
The method of any one of items 1 to 4, wherein the sample comprises a complex with the optical resolving agent.
(Item 6)
The method of any one of items 1 to 5, wherein the sample comprises a mixture of a compound of formula I and a compound of formula II.
(Item 7)
The method of any one of items 1 to 6, wherein the optical resolving agent is selected from phenylethylamine, N-methylglucamine, arginine, lysine, pseudoephedrine, leucinol, and aminophenyl propanol.
(Item 8)
The method of any one of items 1 to 7, wherein the optical resolving agent is phenylethylamine.
(Item 9)
The method of any one of items 1 to 8, wherein the amide-based solvent is one or more solvents selected from N-methylpyrrolidone (NMP), dimethylacetamide (DMA), N,N-dimethylformamide (DMF), N,N-diethylformamide (DEF), tetramethylurea (TMU), and hexamethylphosphoric triamide (HMPA).
(Item 10)
The method of item 9, wherein the amide-based solvent is N-methylpyrrolidone.
(Item 11)
The method of item 9, wherein the amide-based solvent is dimethylacetamide.

(Item 12)
The method of item 9, wherein the amide-based solvent is N,N-dimethylformamide.
(Item 13)
The method of any one of items 7 to 12, wherein the phenylethylamine is (R)-phenylethylamine.
(Item 14)
The method of any one of items 1 to 13, wherein the solid salt is an R-phenylethylamine salt.
(Item 15)
The method of any one of items 1 to 14, wherein the solid salt is an amide-based solvate.
(Item 16)
The method of item 15, wherein the amide-based solvent is one or more solvents selected from N-methylpyrrolidone (NMP), dimethylacetamide (DMA), and N,N-dimethylformamide (DMF).
(Item 17)
The method of item 16, wherein the amide-based solvent is N-methylpyrrolidone.
(Item 18)
The method of item 16, wherein the amide-based solvent is dimethylacetamide.
(Item 19)
The method of item 16, wherein the amide-based solvent is N, N-dimethylformamide.
(Item 20)
The method of any one of items 1 to 19, wherein an enantiomeric excess of a manufactured solid salt of a compound of formula I is at least 98% or greater.
(Item 21)
The method of any one of items 1 to 20, wherein an enantiomeric excess of a manufactured solid salt of a compound of formula I is at least 99% or greater.
(Item 22)
The method of any one of items 1 to 21, further comprising dissolving the phenylethylamine into toluene.
(Item 23)
The method of any one of items 1 to 22, comprising adding a poor solvent to the sample.
(Item 24)
The method of item 23, wherein the poor solvent is toluene or ethyl acetate.
(Item 25)
The method of any one of items 1 to 24, further comprising removing the amide-based solvent.
(Item 26)
A method of manufacturing a compound of formula IIIa, comprising converting a solid salt of a compound of formula I manufactured by the method of any one of items 1 to 25 into a compound of formula IIIa

[Chemical Formula 13]

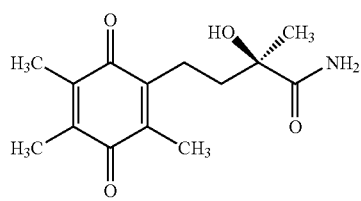

Formula IIIa: (R)-2-hydroxy-2-methyl-4-(2,4,5-trimethyl-3,6-dioxocyclohexa-1,4-dienyl) butanamide.

(Item 27)
A compound of formula IVa:

[Chemical Formula 14]

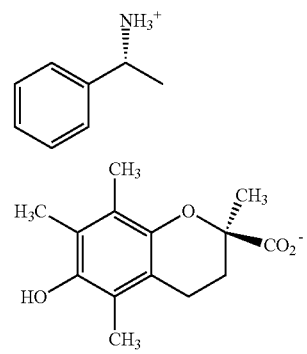

Formula IVa
or a solvate thereof.
(Item 28)
The compound of item 27, which is an amide-based solvate.
(Item 29)
The solvate of any one of items 27 to 28, wherein an amide-based solvent is one or more solvents selected from NMP (N-methylpyrrolidone), DMA (dimethylacetamide), and DMF (N, N-dimethylformamide).
(Item 30)
The solvate of item 29, wherein the amide-based solvent is N-methylpyrrolidone.
(Item 31)
The solvate of item 29, wherein the amide-based solvent is dimethylacetamide.
(Item 32)
The solvate of item 29, wherein the amide-based solvent is N, N-dimethylformamide.
(Item 33)
A pharmaceutical ingredient comprising the compound or solvate of any one of items 27 to 32.
(Item 34)
A method of manufacturing a solid salt of a compound of formula II, comprising adding an amide-based solvent in the presence of an optical resolving agent to a sample comprising compound of formula I:

[Chemical Formula 15]

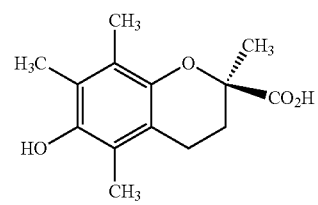

Formula I: (R)-6-hydroxy-2,5,7,8-tetramethylchroman-2-carboxylic acid (hereinafter R Trolox)

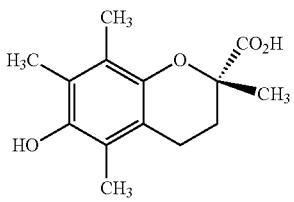

Formula II: (S)-6-hydroxy-2,5,7,8-tetramethylchroman-2-carboxylic acid (hereinafter S Trolox).

(Item 35)
The method of item 34, wherein the optical resolving agent comprises at least an asymmetric carbon, and a moiety that can form a salt with the R Trolox and S Trolox.

(Item 36)
The method of item 34 or 35, comprising adding the optical resolving agent to the sample.

(Item 37)
The method of any one of items 34 to 36, wherein addition of the amide-based solvent comprises adding a mixture of the optical resolving agent and the amide-based solvent to the sample.

(Item 38)
The method of any one of items 34 to 37, wherein the sample comprises a complex with the optical resolving agent.

(Item 39)
The method of any one of items 34 to 38, wherein the sample comprises a mixture of a compound of formula I and a compound of formula II.

(Item 40)
The method of any one of items 34 to 39, wherein the optical resolving agent is selected from phenylethylamine, N-methylglucamine, arginine, lysine, pseudoephedrine, leucinol, and aminophenyl propanol.

(Item 41)
The method of any one of items 34 to 40, wherein the optical resolving agent is phenylethylamine.

(Item 42)
The method of any one of items 34 to 41, wherein the amide-based solvent is one or more solvents selected from N-methylpyrrolidone (NMP), dimethylacetamide (DMA), and N,N-dimethylformamide (DMF).

(Item 43)
The method of item 42, wherein the amide-based solvent is N-methylpyrrolidone.

(Item 44)
The method of item 42, wherein the amide-based solvent is dimethylacetamide.

(Item 45)
The method of item 42, wherein the amide-based solvent is N,N-dimethylformamide.

(Item 46)
The method of any one of items 40 to 45, wherein the phenylethylamine is (R)-phenylethylamine.

(Item 47)
The method of any one of items 34 to 46, wherein the solid salt is an S-phenylethylamine salt.

(Item 48)
The method of any one of items 34 to 47, wherein the solid salt is an amide-based solvate.

(Item 49)
The method of any one of items 34 to 48, wherein the amide-based solvent is one or more solvents selected from N-methylpyrrolidone (NMP), dimethylacetamide (DMA), and N,N-dimethylformamide (DMF).

(Item 50)
The method of item 49, wherein the amide-based solvent is N-methylpyrrolidone.

(Item 51)
The method of item 49, wherein the amide-based solvent is dimethylacetamide.

(Item 52)
The method of item 49, wherein the amide-based solvent is N,N-dimethylformamide.

(Item 53)
The method of any one of items 34 to 52, wherein an enantiomeric excess of a manufactured solid salt of a compound of formula II is at least 98% or greater.

(Item 54)
The method of any one of items 34 to 53, wherein an enantiomeric excess of a manufactured solid salt of a compound of formula II is at least 99% or greater.

(Item 55)
The method of any one of items 34 to 54, further comprising dissolving the phenylethylamine into toluene.

(Item 56)
The method of any one of items 34 to 55, comprising adding a poor solvent to the sample.

(Item 57)
The method of item 56, wherein the poor solvent is toluene or ethyl acetate.

(Item 58)
The method of any one of items 34 to 57, further comprising removing the amide-based solvent.

(Item 59)
A method of manufacturing a compound of formula IIIb, comprising converting a solid salt of a compound of formula II manufactured by the method of any one of items 34 to 58 into a compound of formula IIIb

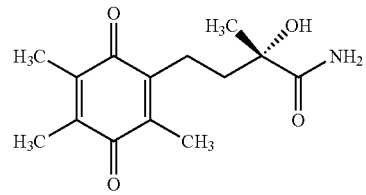

Formula IIIb: (S)-2-hydroxy-2-methyl-4-(2,4,5-trimethyl-3,6-dioxocyclohexa-1,4-dienyl) butanamide.

(Item 60)
A compound of formula IVb:

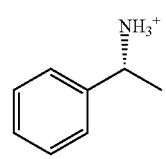

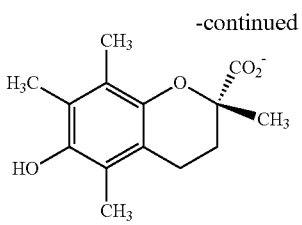

Formula IVb or a solvate thereof.

(Item 61)

The compound of item 60, which is an amide-based solvate.

(Item 62)

The solvate of any one of items 60 to 61, wherein the amide-based solvent is one or more solvents selected from NMP (N-methylpyrrolidone), DMA (dimethylacetamide), and DMF (N, N-dimethylformamide).

(Item 63)

The solvate of item 62, wherein the amide-based solvent is N-methylpyrrolidone.

(Item 64)

The solvate of item 62, wherein the amide-based solvent is dimethylacetamide.

(Item 65)

The solvate of item 62, wherein the amide-based solvent is N, N-dimethylformamide.

(Item 66)

A pharmaceutical ingredient comprising the compound or solvate of any one of items 60 to 65.

(Item 67)

A composition for use in optically resolving a compound, comprising an amide-based solvent.

(Item 68)

The composition of item 67, wherein the compound is a mixture of a compound of formula I and a compound of formula II:

[Chemical Formula 19]

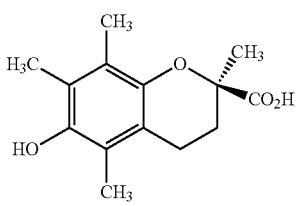

Formula I: (R)-6-hydroxy-2,5,7,8-tetramethylchroman-2-carboxylic acid (hereinafter R Trolox)

[Chemical Formula 20]

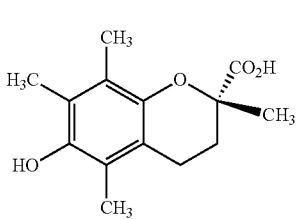

Formula II: (S)-6-hydroxy-2,5,7,8-tetramethylchroman-2-carboxylic acid (hereinafter S Trolox).

(Item 69)

The composition of item 67 or 68, wherein the composition is used with another optical resolving agent.

(Item 70)

The composition of item 69, wherein the another optical resolving agent itself has optical activity.

(Item 71)

The composition of any one of items 67 to 70, wherein the amide-based solvent is one or more solvents selected from N-methylpyrrolidone (NMP), dimethylacetamide (DMA), and N, N-dimethylformamide (DMF).

(Item 72)

The composition of item 71, wherein the amide-based solvent is N-methylpyrrolidone.

(Item 73)

The composition of item 71, wherein the amide-based solvent is dimethylacetamide.

(Item 74)

The composition of item 71, wherein the amide-based solvent is N,N-dimethylformamide.

(Item 74A)

The method of item 67, further comprising a feature of any one or more of items 1 to 74.

(Item 75)

A method of optically resolving a compound, comprising adding an amide-based solvent to the compound.

(Item 75A)

The method of item 75, further comprising a feature of any one or more of items 1 to 74.

(Item 76) Use of an amide-based solvent for optically resolving a compound.

(Item 76A)

The method of item 76, further comprising a feature of any one or more of items 1 to 75.

The present disclosure is intended so that one or more of the aforementioned features can be provided not only as the explicitly disclosed combinations, but also as other combinations. Additional embodiments and advantages of the present disclosure are recognized by those skilled in the art by reading and understanding the following detailed descriptions as needed.

Advantageous Effects of Invention

The present application provides a method of chirally resolving Trolox stably at a high optical purity.

DESCRIPTION OF EMBODIMENTS

Figure 1:
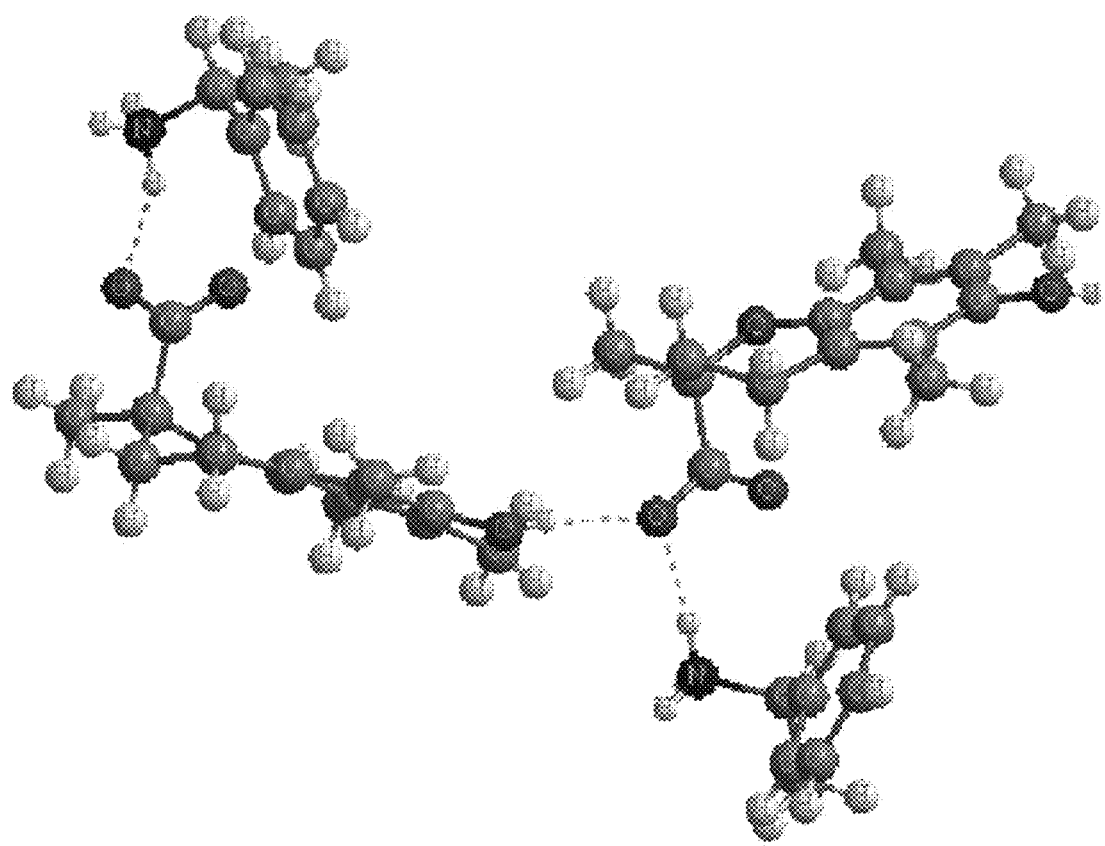
FIG. 1 shows a single crystal X-ray structure of RS-Trolox•R-PEA (racemate: R-Trolox•R-PEA•S-Trolox•R-PEA).

The present disclosure is described hereinafter in more detail. Throughout the entire specification, a singular expression should be understood as encompassing the concept thereof in the plural form, unless specifically noted otherwise. Thus, singular articles (e.g., "a", "an", "the", and the like in the case of English) should also be understood as encompassing the concept thereof in the plural form, unless specifically noted otherwise. Further, the terms used herein should be understood as being used in the meaning that is commonly used in the art, unless specifically noted otherwise. Therefore, unless defined otherwise, all terminologies and scientific technical terms that are used herein have the same meaning as the general understanding of those skilled in the art to which the present invention pertains. In case of a contradiction, the present specification (including the definitions) takes precedence.

The present disclosure is further described in detail hereinafter.

The abbreviations used herein have the conventional meaning within the scope of the art unless specifically noted otherwise.

The term "about" for a value or parameter herein includes variations about the value or parameter itself. Unless specifically noted otherwise, "about X" for example includes "X" itself as well as values with an acceptable error of ±10% therefrom.

As used herein, "Trolox" indicates 6-hydroxy-2,5,7,8-tetramethylchroman-2-carboxylic acid. R form is referred to as R Trolox, and S form is referred to as S Trolox. Trolox can be prepared by a synthesis method that is well known to those skilled in the art, such as the methods described in U.S. Pat. Nos. 3,947,473, 4,003,919, and 4,026,907.

As used herein, "optical resolving agent" refers to an optically active reagent that is useful for separating a racemate into each of the enantiomers, i.e., optical active substances. In the present disclosure, an optical resolving agent can comprise at least an asymmetric carbon, and a moiety that can form a salt with the R Trolox and S Trolox. In the present disclosure, an optical resolving agent can comprise a base moiety. A base moiety can comprise an amine moiety. Examples of optical resolving agents include optical active substances such as phenylethylamine, N-methylglucamine, arginine, lysine, pseudoephedrine, leucinol, and aminophenyl propanol.

As used herein, "moiety that can form a salt with R Trolox and S Trolox" refers to a moiety comprising a functional group that can form a salt with a functional group comprised in R Trolox and S Trolox. For example, Trolox comprises a carboxyl group, so that the "moiety that can form a salt with R Trolox and S Trolox" can be a moiety comprising a base that can form a salt with a carboxyl group. The "moiety that can form a salt with R Trolox and S Trolox" in an optical resolving agent may or may not overlap with asymmetric carbon in the optical resolving agent. Overlapping is conditional on asymmetric carbon effectively functioning (exhibits a behavior that is different from asymmetric carbon of other steric configurations) when or after an optical resolving agent forms a salt with R Trolox and S Trolox. Examples of "moiety that can form a salt with R Trolox and S Trolox" include amino group, imino group, guanidyl group, heterocyclic group (nitrogen containing heterocyclic group such as pyridine, imidazole, indole, or purine) comprising moieties and the like. Examples of compounds comprising asymmetric carbon include tartaric acid, phenylethylamine, N-methylglucamine, amino acid (arginine, lysine, and the like), pseudoephedrine, leucinol, aminophenyl propanol, and the like. Asymmetric carbon having the same backbone as such compounds can be used.

As used herein, "amide-based solvent" refers to a solvent of a compound comprising an amide group (acid amide group). Examples of amide groups include carboxylic acid amide, phosphoric acid amide groups, and the like. Examples of amide-based solvents include N-methylpyrrolidone (NMP), dimethylacetamide (DMA), N,N-dimethylformamide (DMF), N,N-diethylformamide (DEF), tetramethylurea (TMU), and hexamethylphosphoric triamide (HMPA).

As used herein, "poor solvent" refers to a solvent that has the ability to dissolve a solute (substance of interest), but has limited solubility (solvent with low capability to dissolve a solute). Examples of poor solvents in the present disclosure include ethyl acetate, toluene, and the like.

As used herein, "salt" indicates a compound generated by a neutralization reaction between an acid and a base, consisting of a negative component of the acid and positive component of the base. Trolox has a carboxylic acid group and can form a salt with a basic substance.

As used herein, "solid salt" indicates a salt in a solid state among the three states of matter (gas/liquid/solid).

As used herein, "suspect" indicates that something is not confirmed, but is sufficiently expected. This can be false after actual confirmation. For example, "sample comprising the compound of formula I and suspected of comprising a compound of formula II" refers to a sample that comprises a compound of formula I while not confirmed to comprise a compound of formula II, but is sufficiently expected to comprise a compound of formula II.

As used herein, "mixture" indicates two or more substances that are mixed. The ratio of mixture can be any ratio. For example, for a mixture of two substances, the ratio can be 50:50, 45:55, 40:60, 35:65, 30:70, 25:75, 20:80, 15:85, 10:90, 5:95, 1:99, 0.1:99.9, or the like.

As used herein, "enantiomeric excess" indicates the scale representing the ratio of right enantiomer to left enantiomer in a mixture and is abbreviated as ee. If the ratios of the right and left enantiomers in a sample are R and S, respectively, ee can be found by using the following equation.

$$ee(\%)=(R-S)/(R+S)\times 100, \text{ or } (S-R)/(R+S)\times 100$$

For example, the enantiomeric excess of R form is $$(90-10)/(90+10)\times 100 = 80\% \text{ } ee$$

at a ratio of R:S=90:10.

PREFERRED EMBODIMENTS

One embodiment of the present disclosure provides a method of manufacturing a solid salt of a compound of formula I, comprising adding an amide-based solvent in the presence of an optical resolving agent to a sample comprising the compound of formula I and suspected of comprising a compound of formula II:

[Chemical Formula 21]

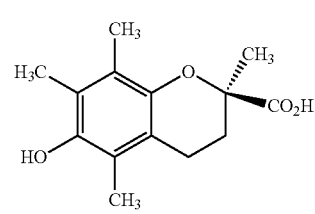

Formula I: (R)-6-hydroxy-2,5,7,8-tetramethylchroman-2-carboxylic acid (hereinafter R Trolox).

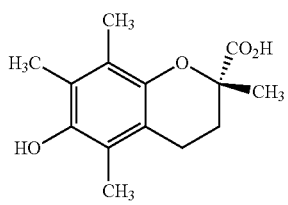

[Chemical Formula 22]

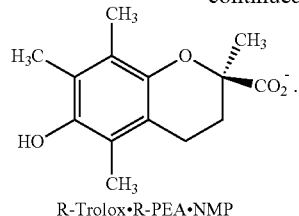

R-Trolox·R-PEA·NMP

R-Trolox. R-PEA. NMP

Formula II: (S)-6-hydroxy-2,5,7,8-tetramethylchroman-2-carboxylic acid (hereinafter S Trolox). R Trolox can be optically resolved stably with the method of the present disclosure. This method provides a solid that can be more readily scaled-up, more readily stirred, and readily filtered, and provides better resolution and/or purity for a desired product.

A solid salt of a compound of formula I can be a salt of a compound of formula I and an optical resolving agent. A solid salt of a compound of formula I can be a solvate of a salt of a compound of formula I and an optical resolving agent and an amide-based solvent.

In this disclosure, the optical resolving agent can comprise at least an asymmetric carbon, and a moiety that can form a salt with the R Trolox and S Trolox. Since Trolox comprises a carboxylic acid moiety, an optical resolving agent can comprise a base moiety forming a salt with carboxylic acid. A base moiety can be amine. For example, if an optical resolving agent is R-phenylethylamine, R Trolox and R-phenylethylamine can form a salt such as the following

[Chemical Formula 23]

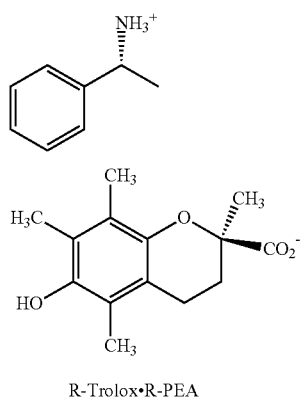

R-Trolox·R-PEA

If a salt of R Trolox and R-phenylethylamine is solvated with N-methylpyrrolidone, this can result in a solvate such as the following

[Chemical Formula 24]

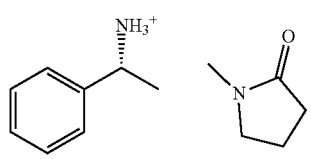

If an optical resolving agent comprises an amine moiety of N-methylglucamine, arginine, lysine, pseudoephedrine, leucinol, aminophenyl propanol, or the like, a salt with the amine moiety that is ammonium can be formed.

The method of the present disclosure can comprise adding an optical resolving agent to the sample.

The addition of the amide-based solvent can be achieved by adding a mixture of the optical resolving agent and the amide-based solvent to the sample. When adding an amide-based solvent, an optical resolving agent and/or amide-based solvent can be already present in a sample (thus, a new amide-based solvent may or may not be added). Addition of an optical resolving agent and addition of an amide-based solvent can be concurrent or independent.

In the present disclosure, the sample can comprise a complex with the optical resolving agent.

In the present disclosure, the sample can comprise a mixture of a compound of formula I and a compound of formula II.

In the present disclosure, the optical resolving agent can be selected from phenylethylamine, N-methylglucamine, arginine, lysine, pseudoephedrine, leucinol, and aminophenyl propanol. An optical resolving agent can be R-phenylethylamine, S-phenylethylamine, N-methyl-D-glucamine, N-methyl-L-glucamine, D-arginine, L-arginine, D-lysine, L-lysine, (1S,2S)-(+)-pseudoephedrine, (1R,2R)-(−)-pseudoephedrine, (R)-(−)-leucinol, (S)-(+)-leucinol, (S)-(−)-2-amino-3-phenyl-1-propanol, or (R)-(+)-2-amino-3-phenyl-1-propanol.

In the present disclosure, the optical resolving agent can be phenylethylamine.

In the present disclosure, the amide-based solvent can be one or more solvents selected from N-methylpyrrolidone (NMP), dimethylacetamide (DMA), N,N-dimethylformamide (DMF), N,N-diethylformamide (DEF), tetramethylurea (TMU), and hexamethylphosphoric triamide (HMPA).

In the present disclosure, the amide-base solvent can be N-methylpyrrolidone.

In the present disclosure, the amide-base solvent can be dimethylacetamide.

In the present disclosure, the amide-base solvent can be N,N-dimethylformamide.

In the present disclosure, the phenylethylamine can be (R)-phenylethylamine.

In the present disclosure, the solid salt can be an R-phenylethylamine salt.

In the present disclosure, the solid salt can be an amide-based solvate.

In the present disclosure, the amide-based solvent can be one or more solvents selected from N-methylpyrrolidone (NMP), dimethylacetamide (DMA), and N,N-dimethylformamide (DMF).

In the present disclosure, the amide-based solvent can be N-methylpyrrolidone.

In the present disclosure, the amide-based solvent can be dimethylacetamide.

In the present disclosure, the amide-based solvent can be N,N-dimethylformamide.

In the present disclosure, an enantiomeric excess of a manufactured solid salt of a compound of formula I can be at least 98% or greater.

In the present disclosure, an enantiomeric excess of a manufactured solid salt of a compound of formula I can be at least 99% or greater.

In the present disclosure, the method can further comprise dissolving the phenylethylamine into toluene.

In the present disclosure, the method can comprise adding a poor solvent to the sample. Advantages of using a poor solvent include improved filterability. While addition of a poor solvent can reduce the viscosity of an amide-based solvent to improve the practicality, the present disclosure is not limited thereto. The optical purity can also be slightly improved by adding a poor solvent.

In the present disclosure, the poor solvent can be toluene or ethyl acetate.

In the present disclosure, the method can further comprise removing the amide-based solvent.

One embodiment of the present disclosure provides a method of manufacturing a compound of formula IIIa, comprising converting a solid salt of a compound of formula I manufactured by the method described above into a compound of formula IIIa:

[Chemical Formula 25]

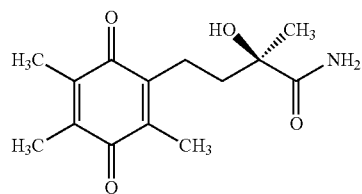

Formula IIIa: (R)-2-hydroxy-2-methyl-4-(2,4,5-trimethyl-3,6-dioxocyclohexa-1,4-dienyl) butanamide.

One embodiment of the present disclosure provides a compound of formula IVa:

[Chemical Formula 26]

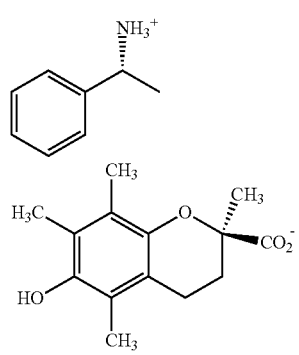

Formula IVa
or a solvate thereof.

In the present disclosure, the compound can be an amide-based solvate.

In the present disclosure, the amide-based solvent can be one or more solvents selected from NMP (N-methylpyrrolidone), DMA (dimethylacetamide), and DMF (N, N-dimethylformamide).

In the present disclosure, the amide-based solvent can be N-methylpyrrolidone.

In the present disclosure, the amide-based solvent can be dimethylacetamide.

In the present disclosure, the amide-based solvent can be N, N-dimethylformamide.

In the present disclosure, a pharmaceutical ingredient comprising a compound or solvate described above can be provided.

One embodiment of the present disclosure provides a method of manufacturing a solid salt of a compound of formula II, comprising adding an amide-based solvent in the presence of an optical resolving agent to a sample comprising a compound of formula II and suspected of comprising a compound of formula I:

[Chemical Formula 27]

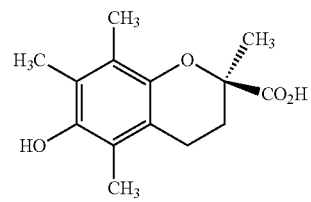

Formula I: (R)-6-hydroxy-2,5,7,8-tetramethylchroman-2-carboxylic acid (hereinafter R Trolox)

[Chemical Formula 28]

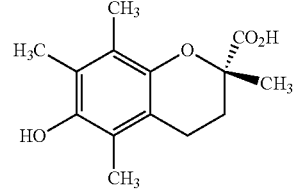

Formula II: (S)-6-hydroxy-2,5,7,8-tetramethylchroman-2-carboxylic acid (hereinafter S Trolox). Trolox can be optically resolved stably by the method of the present disclosure. This method provides a solid that can be more readily scaled-up, more readily stirred, and readily filtered and provides better resolution and/or purity of a desired product.

A solid salt of a compound of formula II can be a salt of the compound of formula II and an optical resolving agent. A solid salt of a compound of formula II can be a solvate of a salt of the compound of formula II and an optical resolving agent and an amide-based solvent.

In the present disclosure, the optical resolving agent can comprise at least an asymmetric carbon, and a moiety that can form a salt with the R Trolox and S Trolox. Since Trolox comprises a carboxylic acid moiety, an optical resolving agent can comprise a base moiety forming a salt with carboxylic acid. A base moiety can be amine. For example, if an optical resolving agent is S-phenylethylamine, S Trolox and S-phenylethylamine can form a salt in an enantiomeric relationship with the R form described above.

The method of the present disclosure can comprise adding the optical resolving agent to the sample.

The addition of the amide-based solvent can be achieved by adding a mixture of the optical resolving agent and the amide-based solvent to the sample. When adding an amide-based solvent, an optical resolving agent and/or amide-based solvent can be already present in a sample (thus, a new amide-based solvent may or may not be added). Addition of an optical resolving agent and addition of an amide-based solvent can be concurrent or independent.

In the present disclosure, the sample can comprise a complex with the optical resolving agent.

In the present disclosure, the sample can comprise a mixture of a compound of formula I and a compound of formula II.

In the present disclosure, the optical resolving agent can be selected from phenylethylamine, N-methylglucamine, arginine, lysine, pseudoephedrine, leucinol, and aminophenyl propanol. An optical resolving agent can be R-phenylethylamine, S-phenylethylamine, N-methyl-D-glucamine, N-methyl-L-glucamine, D-arginine, L-arginine, D-lysine, L-lysine, (1S,2S)-(+)-pseudoephedrine, (1R,2R)-(−)-pseudoephedrine, (R)-(−)-leucinol, (S)-(+)-leucinol, (S)-(−)-2-amino-3-phenyl-1-propanol, or (R)-(+)-2-amino-3-phenyl-1-propanol.

In the present disclosure, the optical resolving agent can be phenylethylamine.

In the present disclosure, the amide-based solvent can be one or more solvents selected from N-methylpyrrolidone (NMP), dimethylacetamide (DMA), and N,N-dimethylformamide (DMF).

In the present disclosure, the amide-based solvent can be N-methylpyrrolidone.

In the present disclosure, the amide-based solvent can be dimethylacetamide.

In the present disclosure, the amide-based solvent can be N,N-dimethylformamide.

In the present disclosure, the phenylethylamine can be (R)-phenylethylamine.

In the present disclosure, the solid salt can be an S-phenylethylamine salt.

In the present disclosure, the solid salt can be an amide-based solvate.

In the present disclosure, the amide-based solvent can be one or more solvents selected from N-methylpyrrolidone (NMP), dimethylacetamide (DMA), and N,N-dimethylformamide (DMF).

In the present disclosure, the amide-based solvent can be N-methylpyrrolidone.

In the present disclosure, the amide-based solvent can be dimethylacetamide.

In the present disclosure, the amide-based solvent can be N,N-dimethylformamide.

In the present disclosure, an enantiomeric excess of a manufactured solid salt of a compound of formula II can be at least 98% or greater.

In the present disclosure, an enantiomeric excess of a manufactured solid salt of a compound of formula II can be at least 99% or greater.

In the present disclosure, the method can further comprise dissolving the phenylethylamine into toluene.

In the present disclosure, the method can comprise adding a poor solvent to the sample. Advantages of using a poor solvent include improved filterability. While addition of a poor solvent can reduce the viscosity of an amide-based solvent to improve the practicality, the present disclosure is not limited thereto. The optical purity can also be slightly improved by adding a poor solvent.

In the present disclosure, the poor solvent can be toluene or ethyl acetate.

In the present disclosure, the method can further comprise removing the amide-based solvent.

One embodiment of the present disclosure provides a method of manufacturing a compound of formula IIIb, comprising converting a solid salt of a compound of formula II manufactured by the method described above into a compound of formula IIIb:

[Chemical Formula 29]

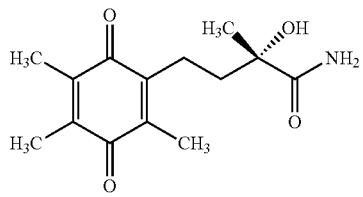

Formula IIIb: (S)-2-hydroxy-2-methyl-4-(2,4,5-trimethyl-3,6-dioxocyclohexa-1,4-dienyl) butanamide.

One embodiment of the present disclosure provides a compound of formula IVb:

[Chemical Formula 30]

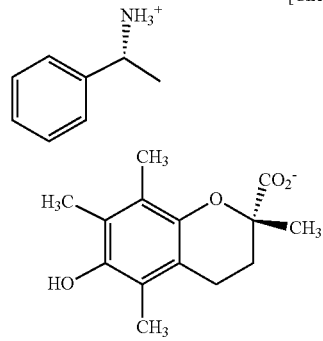

Formula IVb or a solvate thereof.

In the present disclosure, the compound can be an amide-based solvate.

In the present disclosure, the amide-based solvent can be one or more solvents selected from NMP (N-methylpyrrolidone), DMA (dimethylacetamide), and DMF (N,N-dimethylformamide).

In the present disclosure, the amide-based solvent can be N-methylpyrrolidone.

In the present disclosure, the amide-based solvent can be dimethylacetamide.

In the present disclosure, the amide-based solvent can be N,N-dimethylformamide.

The present disclosure can provide a pharmaceutical ingredient comprising a compound or solvate described above.

One embodiment of the present disclosure provides a composition for use in optically resolving a compound, comprising an amide-based solvent.

In the present disclosure, the compound can be a mixture of a compound of formula I and a compound of formula II:

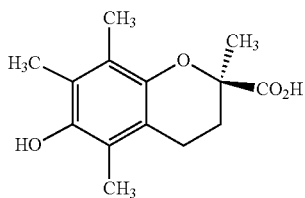

Formula I: (R)-6-hydroxy-2,5,7,8-tetramethylchroman-2-carboxylic acid (hereinafter R Trolox)

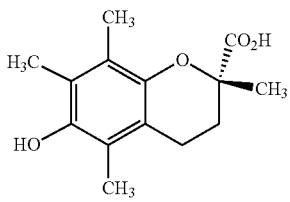

Formula II: (S)-6-hydroxy-2,5,7,8-tetramethylchroman-2-carboxylic acid (hereinafter S Trolox).

In the present disclosure, the composition can be used with another optical resolving agent.

In the present disclosure, the another optical resolving agent itself can have optical activity.

In the present disclosure, the amide-based solvent can be one or more solvents selected from N-methylpyrrolidone (NMP), dimethylacetamide (DMA), and N,N-dimethylformamide (DMF).

In the present disclosure, the amide-based solvent can be N-methylpyrrolidone.

In the present disclosure, the amide-based solvent can be dimethylacetamide.

In the present disclosure, the amide-based solvent can be N,N-dimethylformamide.

One embodiment of the present disclosure provides a method of optically resolving a compound, comprising adding an amide-based solvent to the compound.

One embodiment of the present disclosure provides use of an amide-based solvent for optically resolving a compound.

In one embodiment of the present disclosure, X-ray powder diffraction (XRPD) on RS-Trolox•R-PEA (racemate) exhibits 2θ peaks at 8.54°, 12.55°, 13.45°, 15.41°, 17.11°, 18.87°, 21.00°, 22.19°, and 23.83°, but the peaks are not limited thereto. X-ray powder diffraction may have an appropriately number of peaks (1, 2, 3, 4, 5, 6, 7, 8, 9, 10 or any integer value that is greater) selected from angles with the largest Gross Intensity specified in Table 6. In regards to the assignment of X-ray powder diffraction (XRPD), 2θ can have an error in the range of ±0.2° with respect to the exhibited value in the present disclosure.

In one embodiment of the present disclosure, X-ray powder diffraction (XRPD) on R-Trolox•R-PEA exhibits 2θ peaks at 6.75°, 7.19°, 9.86°, 13.49°, 14.37°, 14.67°, 15.29°, 21.51°, 22.71°, 23.31°, 27.10°, and 28.03°, but the peaks are not limited thereto. X-ray powder diffraction may have an appropriately number of peaks (1, 2, 3, 4, 5, 6, 7, 8, 9, 10 or any integer value that is greater) selected from angles with the largest Gross Intensity specified in Table 6.

In one embodiment of the present disclosure, X-ray powder diffraction (XRPD) on R-Trolox•R-PEA•NMP (solvate) exhibits peaks at 5.30°, 7.69°, 8.94°, 10.55°, 12.78°, 14.41°, 15.04°, 15.35°, 15.83°, 17.86°, 19.56°, 22.34°, 25.43°, 26.48°, and 27.47° as characteristic 2θ therein, but the peaks are not limited thereto. X-ray powder diffraction may have an appropriately number of peaks (1, 2, 3, 4, 5, 6, 7, 8, 9, 10 or any integer value that is greater) selected from angles with the largest Gross Intensity specified in Table 6.

A crystal exhibits various structures, shapes, aggregation states, and the like depending on the crystallization conditions. A solvate with a solvent incorporated in a crystal is also referred to as a crystal pseudopolymorphism to distinguish from crystal polymorphisms in the strict sense. In such a case, physicochemical properties of a crystal can be significantly influenced by the solvent's contribution to crystal lattice formation or interaction with a molecule to be crystallized. Various factors such as the properties of a solvent, degree of supersaturation, and temperature associated with crystallization conditions can determine the properties of a crystal. The present disclosure is capable of stable chiral resolution of Trolox at a high optical purity by suitably selecting an optical resolving agent and solvent.

While it was observed that Trolox could no longer be optically resolved if phenethylamine was used as an optical resolving agent in a non-amide-based solvent, Trolox was able to be optically resolved stably by using an amide-based solvent.

The method of the present disclosure utilizes an optical resolving agent for separating (R)- and (S)-Trolox enantiomers. The resolving agent forms a solid salt with one of (R)- and (S)-Trolox enantiomers, while substantially not forming a solid salt with the other under a specific reaction condition. In some embodiments, if a resolving agent forms a solid salt with a Trolox enantiomer, at least about 50% of the Trolox enantiomer forms a solid salt with the resolving agent under a specific reaction condition. In various embodiments, if a resolving agent forms a solid salt with a Trolox enantiomer, at least about 60%, at least about 70%, at least about 80%, at least about 85%, at least about 90%, at least about 95%, at least about 96%, at least about 97%, at least about 98%, or at least about 99% of the Trolox enantiomer forms a solid salt with the resolving agent under a specific reaction condition. "Substantially not forming a solid salt" indicates that less than about 10% of (non-solid salt forming) Trolox enantiomer form a solid salt with a resolving agent under a specific reaction condition. In various embodiments, "substantially not forming a solid salt" indicates that less than about 9%, less than about 8%, less than about 7%, less than about 6%, less than about 5%, less than about 4%, less than about 3%, less than about 2%, less than about 1%, less than about 0.5%, or less than about 0.1% of (non-solid salt forming) Trolox enantiomer form a solid salt with a resolving agent under a specific reaction condition. A solid salt can form a solvate with an amide-based solvent.

"Yield" indicates the % of Trolox enantiomer obtained relative to the amount of starting material. For example, if 100 g of 50/50 racemic mixture of (R)/(S)-Trolox is resolved and 50 g of (S)-Trolox is recovered, the yield is 50%. If 30 g of (S)-Trolox is recovered, the yield is 30%. For recovery of Trolox salt, the yield is not calculated as salt counterion, but by assuming only Trolox is present. For example, if 100 g of 50/50 racemic mixture of (R)/(S)-Trolox is resolved, 40 g of (S)-Trolox salt is recovered, and the theoretical weight of (S)-Trolox contained in the salt is 30 g, the yield is 30%. If (R)-Trolox and (S)-Trolox are both resolved and 50 g of each is recovered, the yield is 100%.

While the compounds described herein can be produced and used as a neutral (non-salt) compound, the descriptions are intended to encompass all salts of the compounds described herein and a method using such salts of compounds. In one embodiment, a salt of a compound includes a pharmaceutically acceptable salt. A pharmaceutically acceptable salt is a salt that can be administered as a drug or a pharmaceutical product to humans and/or animals and retains at least some of the biological activity of a free compound (neutral compound or non-salt compound) upon administration. A desirable salt of a basic compound can be prepared using a method known to those skilled in the art by treating the compound with an acid. Examples of inorganic acids include, but are not limited to, hydrochloric acid, hydrobromic acid, sulfuric acid, nitric acid, and phosphoric acid. Examples of organic acids include, but are not limited to, formic acid, acetic acid, propionic acid, glycolic acid, pyruvic acid, oxalic acid, maleic acid, malonic acid, succinic acid, fumaric acid, tartaric acid, citric acid, benzoic acid, cinnamic acid, mandelic acid, sulfonic acid, and salicylic acid. Salts of basic compounds with amino acid such as aspartate and glutamate can also be prepared. A desired salt of an acidic compound can be prepared by a method known to those skilled in the art by treating the compound with a base. Examples of inorganic salts of an acid compound include, but are not limited to, alkali metals and alkaline earth salts, such as sodium salt, potassium salt, magnesium salt, and calcium salt; ammonium salts; and aluminum salts. Examples of organic salts of an acid compound include, but are not limited to, salts of procaine, dibenzylamine, N-ethylpiperidine, N,N-dibenzylethylenediamine, and triethylamine. Salts of an acidic compound with amino acid such as lysine salt or the like can also be prepared. Additional salts that are particularly useful for pharmaceutical preparations are described in Berge S. M. et al., "Pharmaceutical salts", 1. Pharm. Sci., January 1977; Vol. 66 (No. 1): pages 1 to 19.

Applications

Compounds manufactured by the method of the present disclosure are useful as a pharmaceutical ingredient. The compounds can be used as an intermediate for preparing an optically active medicament.

Synthesis reaction parameter Examples of solvents utilized in the synthesis of the compounds and compositions of the present disclosure include water, acetonitrile ("ACN"), diethyl ether, 2-methyltetrahydrofuran ("2-MeTHF"), ethyl acetate ("EtOAc"), ethanol ("EtOH"), isopropyl alcohol ("IPA"), isopropyl acetate ("IPAc"), methanol (MeOH), and the like, and mixtures thereof.

The term "q.s. (appropriate amount)" means to add an amount sufficient to achieve the described function, e.g., to reach a desired volume (e.g., 100%) of a solution.

The technologies that are useful for synthesizing the compounds and compositions herein are obvious and readily available to those skilled in the art by considering the teachings described herein. The following discussion is provided for exemplification of a specific method among the various methods that are available for use in the construction of the compounds and compositions herein. However, the discussion is not intended to define the scope of the reaction that is useful in preparing the compounds and compositions herein or the order of reactions.

Other methods for generating the compounds and compositions of the present disclosure are apparent to those skilled in the art by reviewing the teachings herein.

EXAMPLES

The following abbreviations can also be used in the Examples and the Tables therein to simplify the descriptions of the specification.

Trolox: 6-hydroxy-2,5,7,8-tetramethylchroman-2-carboxylic acid
R-Trolox: R-6-hydroxy-2,5,7,8-tetramethylchroman-2-carboxylic acid
S-Trolox: S-6-hydroxy-2,5,7,8-tetramethylchroman-2-carboxylic acid
RS-Trolox: RS-6-hydroxy-2,5,7,8-tetramethylchroman-2-carboxylic acid (racemate)
PEA: 1-phenylethylamine
R-PEA: R-1-phenylethylamine
S-PEA: S-1-phenylethylamine
EtOAc: ethyl acetate
$^i$PrOAc: isopropyl acetate
NMP: N-methylpyrrolidone
DMA: dimethylacetamide
DMF: N,N-dimethylformamide
DMP: N,N-dimethylpropionamide
MTBE: methyl tert-butyl ether
DME: 1,2-dimethoxyethane
2-MeTHF: 2-methyltetrahydrofuran
MEK: methyl ethyl ketone
DMSO: dimethyl sulfoxide
$CDCl_3$: deuterated chloroform
MeOH: methanol
MeCN: acetonitrile
IPA: 2-propanol
CDI: carbonyldiimidazole For symbols used in NMR, δ means chemical shift, s means singlet, d means doublet, t means triplet, q means quartet, m means multiplet, and J means spin coupling constant.

S-Trolox used in the Examples was purchased from Sigma-Aldrich. RS-Trolox used in the Examples was purchased from D-STONE. A method of manufacturing a compound in the present disclosure by using a seed crystal, when the compound is made for the first time, can be carried out by utilizing the small amount of the product produced without using a seed crystal as a seed crystal for the next run.

(Method of Measuring Optical Purity)

Optical purity is measured and calculated by comparing each peak area by high performance liquid chromatography (HPLC). The measurement conditions are the following. Retention time is indicated as Rt (min).

Optical Purity

Column: Chiralpak AD-3 3 μm (250×4.6 mm)
Mobile phase: hexane/2-propanol-trifluoroacetate: 900/100/1
Flow rate: 1.0 mL/min
Column temperature: 35° C.
Wavelength: 205 nm The Rt of each compound measured under the above measurement conditions is shown in the following Table.

TABLE 1

| Rt | Compound |
| --- | --- |
| 11.3 | R-Trolox |
| 13.4 | S-Trolox |

Example 1

Study on Solvents (Non-Amide-Based)

S-Trolox (0.67 g), R-PEA (0.11 g), and solvent were added to R-Trolox•R-PEA (1.0 g) to reslurry the mixture at room temperature. After maintaining the temperature at 30°

C. for 3 hours, the slurry was cooled to 5° C. and stirred overnight. After stirring overnight at 5° C., crystals were filtered to measure the optical purity of the crystals.

TABLE 2

| Solvent | Optical purity | Amount of product produced |
|---|---|---|
| EtOAc | −0.2% ee | 1.18 g |
| 2 wt % H₂O/EtOAc | −0.2% ee | 1.10 g |
| IPAc | −1.0% ee | 1.27 g |
| MEK | −0.1% ee | 1.07 g |
| MeCN | −0.9% ee | 1.33 g |
| IPA | 94.7% ee | 0.72 g |
| 2-MeTHF | 98.3% ee | 0.55 g |
| DME | 80.1% ee | 0.60 g |
| CPME | 66.1% ee | 0.74 g |
| Toluene | 36.0% ee | 1.07 g |
| Xylene | 27.3% ee | 1.23 g |
| Chlorobenzene | 99.2% ee | 0.53 g |

While it has been shown that the non-amide-based solvent 2-MeTHF is capable of optically resolving the compound, such solvents was not optically resolving the compound thereafter. Although optical purity was higher with 2-MeTHF and chlorobenzene, the raw material R-Trolox•R-PEA (1.0 g) is reduced to about half (0.55 g and 0.53 g, respectively).

Example 2

Study on Amide-Based Solvent (NMP or DMA)

At room temperature, NMP (70.0 g) or DMA (70.0 g) and R-PEA were added to Trolox (10.0 g), and the temperature was raised to 50° C. The mixture was filtrated for removing debris and washed with NMP (20.0 g). After the solution was cooled to 25° C., and R-Trolox•R-PEA (0.01 g) seed crystal was seeded and incubated for 3 hours, and cooled to 10° C., incubated overnight, and then the precipitate was filtered out. The precipitate was washed with NMP or DMA (15.0 g), washed twice with IPAc (15.0 g), and then dried to obtain an amide solvate of R-Trolox•R-PEA.

TABLE 3

| Solvent | NMP | DMA |
|---|---|---|
| Yield | 34.3% | 27.8% |
| Optical purity | 98.3% ee | 98.6% ee |
| Solvent content | 21.3% | 16.7% |

Example 3

Method of Obtaining R-Trolox•R-PEA•NMP (Solvate) from RS-Trolox•R-PEA (Racemate) (NMP/DMA Mixture Solvent)

At room temperature, NMP (10.0 g), DMA (10.0 g), and RS-Trolox (2.00 g) were added, and the temperature was raised to 50° C. The solution was then cooled to 25° C., and R-Trolox•R-PEA (0.01 g) seed crystal was seeded and incubated for 1 hour, cooled to 10° C., and incubated overnight, and then the precipitate was filtered out. The precipitate was washed with an NMP/DMA mixture solvent (1.5 g/1.5 g), washed twice with IPAc (3.0 g), and then dried to obtain an NMP solvate of R-Trolox•R-PEA (yield: 0.76 g, yield rate 30.1%, optical purity: 98.3% ee).

Example 4

Method of Obtaining R-Trolox•R-PEA•NMP (Solvate) from RS-Trolox•R-PEA (Racemate) (NMP Solvent)

RS-Trolox•R-PEA (100 mg) was dissolved in NMP (1 mL) and stirred for 3 hours. The precipitated crystals were then filtered out (optical purity: 98.7% ee)

Example 5

Solubility of RS-Trolox•R-PEA, R-Trolox•R-PEA, and S-Trolox•R-PEA to Ethyl Acetate Solvent Each crystal was reslurried by adding ethyl acetate. The solubility was calculated from analyzing the content of supernatant solution of each reaction solution at each temperature.

TABLE 4

| Temperature [° C.] | rac-Trolox | R-Trolox | S-Trolox |
|---|---|---|---|
| 0 | 0.02% | 0.07% | 2.6% |
| 15 | 0.02% | 0.09% | 9.9% |
| 30 | 0.07% | 0.10% | 14.2% |
| 45 | 0.38% | 0.40% | |
| 60 | 1.08% | 0.78% | |
| 75 | 2.82% | 0.83% | |

Example 6

Solubility of R-Trolox•R-PEA, S-Trolox•R-PEA, and S-Trolox to NMP and DMA

Each crystal was reslurried by adding an amide-based solvent (NMP, DMA). The solubility was calculated from analyzing the content of supernatant solution of each reaction solution at each temperature.

TABLE 5

| | Solubility [%] | | | | | |
|---|---|---|---|---|---|---|
| Temperature | R-TroloxPEA | | S-TroloxPEA | | S-Trolox (Free) | |
| [° C.] | NMP | DMA | NMP | DMA | NMP | DMA |
| 20 | 0.5 | 0.4 | ≥10% | | ≥10% | |

Example 7

Double Crystallization Using NMP Solvent for Improving Optical Purity (First Step: Optical Resolution, Second Step: Recrystallization)

At room temperature, NMP (490.4 g) and R-PEA (28.90 g) were added to Trolox (70.0 g), and the temperature was raised to 50° C. The mixture was filtrated for removing debris and washed with NMP (140.59 g). After the solution was cooled to 25° C., R-Trolox•R-PEA (0.693 g) seed crystal was seeded and incubated for 3 hours, cooled to 10° C., and incubated overnight, and then the precipitate was filtered out. The precipitate was washed with NMP (105.0 g), washed twice with IPAc (105.0 g), and then dried to obtain an amide solvate of R-Trolox•R-PEA (yield: 43.57 g, percentage yield 33.1%, optical purity: 97.2% ee).

NMP (47.87 g) was added to the crystal obtained above (10 g), and the temperature was raised to 60° C. After the solution was cooled to 40° C., R-Trolox•R-PEA (0.1 g) seed crystal was seeded and incubated for 2 hours, cooled to 10°

C., and incubated for 1.5 hours, and then the precipitate was filtered out. The precipitate was washed with NMP (16 g), washed twice with isopropyl acetate (8 g), and then dried to obtain an amide solvate of R-Trolox•R-PEA (yield: 7.61 g, percentage yield 76.1%, optical purity: 99.8% ee).

Example 8

Double Crystallization Using NMP/Toluene Mixture Solvent for Improving Optical Purity and Filterability (First Step: Optical Resolution, Second Step: Recrystallization)

At room temperature, NMP (1440 g) and toluene (5760 g) were added to Trolox (800 g), and the temperature was raised to 50° C. The mixture was filtrated for removing debris and washed with NMP/toluene mixture solvent (160 g/640 g). After adding R-PEA (232 g) at 50° C. and cooling the solution to 45° C., R-Trolox•R-PEA (0.8 g) seed crystal was seeded and incubated for 2 hours. R-PEA (97 g) was added dropwise over an hour and then incubated for 30 minutes. The mixture was cooled to 0° C. and incubated overnight, and then the precipitate was filtered out. The precipitate was washed twice with NMP/toluene mixture solution (320 g/1280 g), washed with toluene (1600 g), and then dried to obtain an amide solvate of R-Trolox•R-PEA (yield: 624 g, percentage yield 41.5%, optical purity: 96.8% ee).

NMP (1650 g) and toluene (4950 g) were added to the crystal obtained above (550 g), and the temperature was raised to 70° C. After 30 minutes of incubation, the solution was cooled to 60° C. R-Trolox•R-PEA (0.6 g) seed crystal was seeded and incubated for 30 minutes, cooled to 0° C., and incubated overnight, and then the precipitate was filtered out. The precipitate was washed with an NMP/toluene mixture solvent (206 g/619 g), washed with toluene (825 g), and then dried to obtain an amide solvate of R-Trolox•R-PEA (yield: 514 g, percentage yield 93.4%, optical purity: >99.9% ee).

Example 9

Double Crystallization Using NMP/Ethyl Acetate Mixture Solvent for Improving Optical Purity and Filterability (First Step: Optical Resolution, Second Step: Recrystallization)

At room temperature, NMP (10.80 kg) and ethyl acetate (43.20 kg) were added to Trolox (6.00 kg), and the temperature was raised to 50° C. After filtration to remove debris, the mixture was washed with an NMP/ethyl acetate mixture solvent (1.20 kg/4.80 kg). At 50° C., R-PEA (1.74 kg) was added and then R-Trolox•R-PEA•NMP (6.04 g) was seeded as a seed crystal and incubated for 2 hour. After adding R-PEA (0.73 kg) dropwise over 1 hour, the mixture was incubated for 30 minutes. After cooling the mixture to 5° C. and incubating overnight, the precipitate was filtered out. The precipitate was washed twice with an NMP/ethyl acetate mixture solvent (2.40 kg/9.60 kg), washed twice with toluene (12.00 kg), and then dried to obtain an NMP solvate of R-Trolox•R-PEA (yield: 4.53 kg, percentage yield 40.2%, optical purity: 96.6% ee).

NMP (9.00 kg) and ethyl acetate (27.00 kg) were added to the crystal obtained above (3.00 kg), and the temperature was raised to 68° C. After the solution was cooled to 60° C., R-Trolox•R-PEA•NMP (3.02 g) was seeded as a seed crystal and incubated for 1 hour, cooled to 5° C., and incubated overnight, and then the precipitate was filtered out. The precipitate was washed twice with an NMP/ethyl acetate mixture solvent (1.13 kg/3.38 kg), washed twice with ethyl acetate (4.50 kg), and then dried to obtain an NMP solvate of R-Trolox•R-PEA (yield: 2.71 g, percentage yield 90.3%, optical purity: >99.9% ee).

Example 10

Single Crystal X Ray Structure Analysis of RS-Trolox•R-PEA (Racemate) and R-Trolox•R-PEA•NMP (Solvate)

Figure 2:
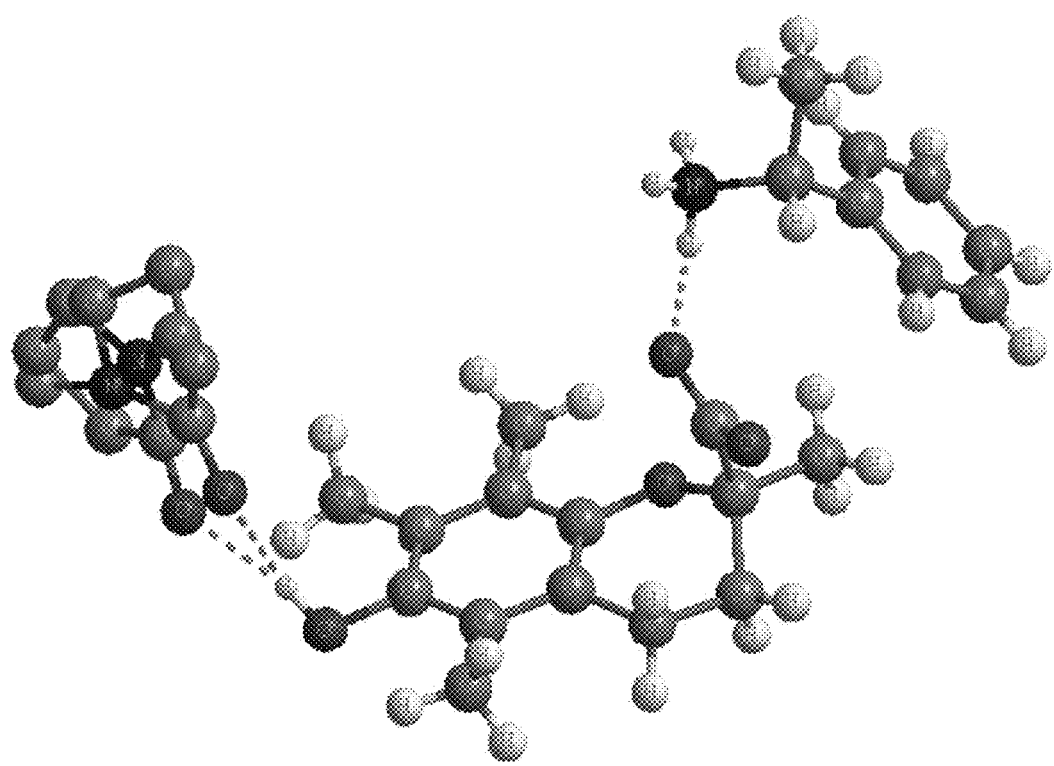
FIG. 2 shows a single crystal X-ray structure of R-Trolox•R-PEA•NMP.

The single crystal X-ray structures of RS-Trolox•R-PEA (racemate) and R-Trolox•R-PEA•NMP (solvate) were analyzed. FIGS. 1 and 2 show the analysis. Measurement apparatus: Rigaku single crystal X-ray diffractometer (model number: VariMax RAPID RA-Micro7). Measurement temperature: −170° C. Analysis program: Crystal-Structure crystallographic software package.

RS-Trolox•R-PEA (racemate) was specifically measured as follows.
(Data Collection)

A colorless prism crystal of $C_{22}H_{29}NO_4$ with approximate dimensions of 0.200×0.110×0.090 mm was placed on a glass fiber. All measurements were taken with a Rigaku R-AXIS RAPID diffractometer using multilayer mirror monochromator Mo—Kα radiation.

The distance between the crystal and detector was 127.40 mm.

The cell constants and rotation matrix for data collection were compatible with a simple triclinic unit cell having a dimension:
[Numeral 1]

| | |
|---|---|
| a = 9.04561(19) Å | α = 91. 615(7)° |
| b = 10.3133(2) Å | β = 93. 663(7)° |
| c = 10.3424(2) Å | γ = 94.236(7)° |
| V = 959.72(4) Å³ | |

For Z=2 and formula weight=371.48, the calculated density is 1.285 g/cm³. The space group was determined as P1 (#1) based on statistical analysis of the intensity distribution and successful analysis and refinement of the structure.

Data was collected up to the maximum 2θ value of 55.0° at a temperature of −170° C.±1° C. A total of 192 oscillation images were collected. Data was swept using ω scan from 130.0° to 190° in 2.00° steps at χ=45.0° and φ=0.0°. The exposure rate was 80.0 [seconds/°]. The second sweep was performed using ω scan from 0.0° to 162.0° in 2.00° steps at χ=45.0° and φ=180.0°. The exposure rate was 80.0 [seconds/°]. Another sweep was performed using ω scan from 0.0° to 162.0° in 2.00° steps at χ=45.0° and φ=90.0°. The exposure rate was 80.0 [seconds/°]. The distance between the crystal and detector was 127.40 mm. Read out was performed at a 0.100 mm pixel mode.
(Data Reduction)

If θ is unique among the collected θ reflections ($R_{int}$=0.0115), equivalent reflections were consolidated.

The linear absorption coefficient μ for Mo—Kα was 0.875 cm⁻¹. An empirical absorption correction that results in the transmission rate in the range of 0.958 to 0.992 was applied. The data was corrected for Lorentz and polarization effects.
(Structural Analysis and Refinement)

The structure was analyzed using a direction method (SHELXT Version 2014/5: Sheldrick, G. M. (2014). Acta Cryst. A70, C1437) and expanded using Fourier technique. Non-hydrogen atoms were refined anisotropically. Hydrogen atoms were refined by using a riding model. The final cycle of full-matrix least-squares refinement on $F^2$ converged by using the following unweighted and weighted match factors based on 8184 observed reflections and 501 variable parameters (greatest parameter shift was 0.00-fold of esd).
[Numeral 2]

$$R1=\Sigma||Fo|-|Fc||/\Sigma|Fo|=0.0285$$

$$wR2=[\Sigma(w(Fo^2-Fc^2)^2)/\Sigma w(Fo^2)^2]^{1/2}=0.0736$$

Least square function minimization: (SHELXL Version 2017/1)

$$\Sigma w(Fo^2-F_e 2)^2 \text{ wherein } w=\text{least square weighting.}$$

The goodness of fit was 1.06. The goodness of fit is defined as follows:

$$[\Sigma w(Fo^2-Fc^2)^2/(No-Nv)]^{1/2}$$

wherein No=number of observeations
Nv=number of variables.

Unit weighting was used. The maximum and minimum peaks of the final differential Fourier map corresponded to 0.31 and −0.20 e⁻/Å³, respectively. The final Flack parameter (Parsons, S. and Flack, H. (2004), Acta Cryst. A60, s61) was 0.11 (11), showing that the absolute structure that was present was correct (Flack, H. D. and Bernardinelli (2000), J. Appl. Cryst. 33, 114-1148).

Neutral atomic scattering factors were taken from the International Table in Crystallography (IT), Vol. C, Table 6.1.1.4 (International Tables for Crystallography, Vol. C (1992). Ed. A. J. C. Wilson, Kluwer Academic Publishers, Dordrecht, Netherlands, Table 6.1.1.4, pp. 572). The anomalous dispersion effect was included in Fcalc (Ibers, J. A. & Hamilton, W. C.; Acta Crystallogr., 17, 781 (1964)); the values of Δf' and Δf" were from Creagh and McAuley (Creagh, D. C. & McAuley, W. J.; "International Tables for Crystallography", Vol C, (A. J. C. Wilson, ed.), Kluwer Academic Publishers, Boston, Table 4.2.6.8, pages 219-222 (1992)). The values of mass attenuation coefficient were from Creagh and Hubbell (Creagh, D. C. & Hubbell, J. H.; "International Tables for Crystallography", Vol C, (A.J.C. Wilson, ed.), Kluwer Academic Publishers, Boston, Table 4.2.4.3, pages 200-206 (1992)). All calculations used CrystalStructure (CrystalStructure 4.3: Crystal Structure Analysis Package, Rigaku Corporation (2000-2018). Tokyo 196-8666, Japan) crystallography software packages except for refinement using SHELXL Version 2017/1 (SHELXL Version 2017/1: Sheldrick, G. M. (2008). Acta Cryst. A64, 112-122).

Crystal data were as follows.

[Numeral 3]

| | |
|---|---|
| Empirical Formula | $C_{22}H_{29}NO_4$ |
| Formula Weight | 371.48 |
| Crystal Color, Habit | colorless, prism |
| Crystal Dimensions | 0.200 × 0.110 × 0.090 mm |
| Crystal System | triclinic |
| Lattice Type | Primitive |
| Lattice Parameters | a = 9.04561(19) Å |
| | b = 10.3133(2) Å |
| | c = 10.3424(2) Å |
| | α = 91.615(7)° |
| | β = 93.663(7)° |
| | γ = 94.236(7)° |
| | V = 959.72(4) Å³ |
| Space Group | P1 (#1) |
| Z value | 2 |
| $D_{calc}$ | 1.285 g/cm³ |
| $F_{000}$ | 400.00 |
| μ(MoKα) | 0.875 cm⁻¹ |

Intensity measurements were as follows.

[Numeral 4]

| | |
|---|---|
| Diffractometer | R-AXIS RAPID |
| Radiation | MoKα (λ = 0.71075 Å) |
| | multi-layer mirror monochromated |
| Voltage, Current | 50 kV, 24 mA |
| Temperature | −170.0° C. |
| Detector Aperture | 460.0 × 256.0 mm |
| Data Images | 192 exposures |
| ω oscillation Range (χ = 45.0, φ = 0.0) | 130.0-190.0° |
| Exposure Rate | 80.0 sec./° |
| ω oscillation Range (χ = 45.0, φ = 180.0) | 0.0-162.0° |
| Exposure Rate | 80.0 sec./° |
| ω oscillation Range (χ = 45.0, φ = 90.0) | 0.0-162.0° |
| Exposure Rate | 80.0 sec./° |
| Detector Position | 127.40 mm |
| Pixel Size | 0.100 mm |
| $2\theta_{max}$ | 55.0° |
| No. of Reflections Measured | Total: 16466 |
| | Unique: 8184 ($R_{int}$ = 0.0115) |
| | Parsons quotients (Flack × parameter): 3584 |
| Corrections | Lorentz-polarization |
| | Absorption |
| | (trans. factors: 0.958-0.992) |

Structural analysis and refinement were the following.

[Numeral 5]

| | |
|---|---|
| Structure Solution | Direct Methods (SHELXT Version 2014/5) |
| Refinement | Full-matrix least-squares on F² |
| Function Minimized | $\Sigma w (Fo^2 - Fc^2)^2$ |
| Least Squares Weights | w = 1/[σ²(Fo²) + (0.0446 · P)² + 0.1771 · P] |
| | where P = (Max(Fo², 0) + 2Fc²)/3 |
| $2\theta_{max}$ cutoff | 55.0° |
| Anomalous Dispersion | All non-hydrogen atoms |
| No. Observations (All reflections) | 8184 |
| No. Variables | 501 |
| Reflection/Parameter Ratio | 16.34 |
| Residuals: R1 (I > 2.00σ(I)) | 0.0285 |
| Residuals: R (All reflections) | 0.0293 |
| Residuals: wR2 (All reflections) | 0.0736 |
| Goodness of Fit Indicator | 1.060 |
| Flack parameter (Parsons' quotients = 3584) | 0.11(11) |
| Max Shift/Error in Final Cycle | 0.000 |
| Maximum peak in Final Diff. Map | 0.31 e⁻/Å³ |
| Minimum peak in Final Diff. Map | −0.20 e⁻/Å³ |

Example 11

X-ray powder diffraction (XRPD) on RS-Trolox•R-PEA (racemate), R-Trolox•R-PEA, and R-Trolox•R-PEA•NMP (solvate)

Figure 3:
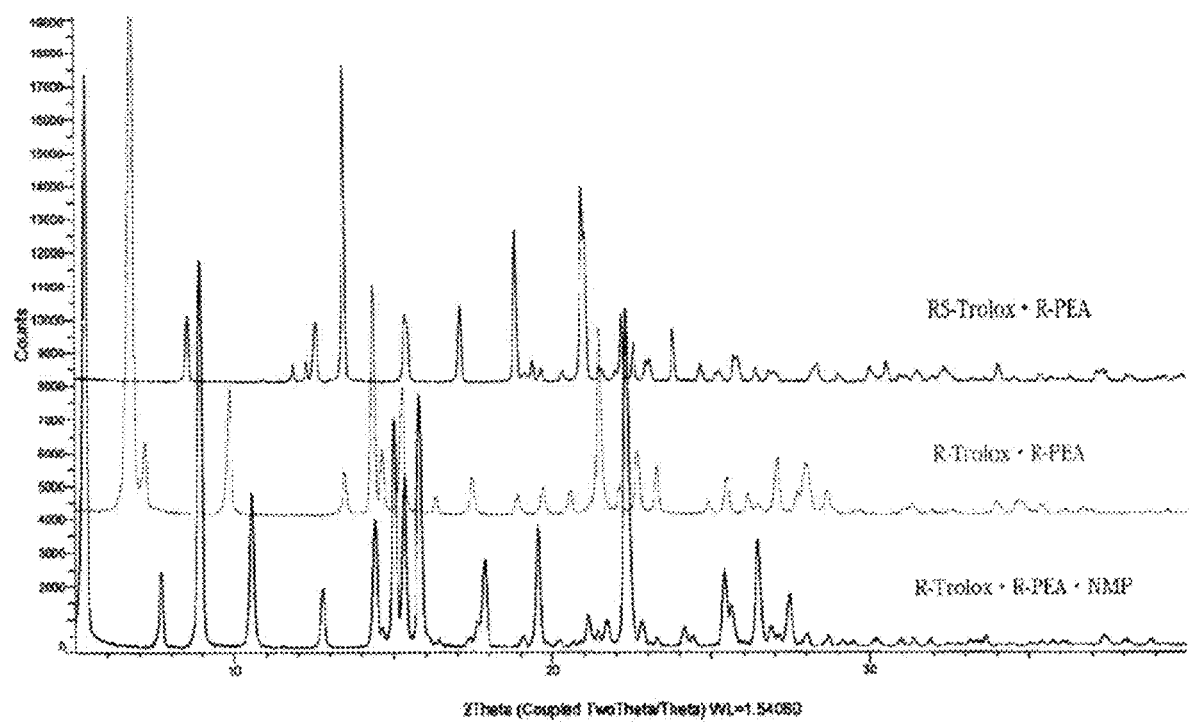
FIG. 3 FIG. 3 shows results of X-ray powder diffraction (XRPD) on RS-Trolox-R-PEA (racemate), R-Trolox•R-PEA, and R-Trolox•R-PEA•NMP (solvate). The value at the left end of the horizontal axis of FIG. 3 is "5".

X-ray powder diffraction (XRPD) was performed on RS-Trolox•R-PEA (racemate), R-Trolox•R-PEA, and R-Trolox•R-PEA•NMP (solvate). FIG. 3 and Table 6 show the results. X-ray powder diffraction (XRPD) was measured at room temperature under conditions of Cu Kα ray, X-ray tube current of 40 milliamperes, a voltage of 40 kilovolts, step of 0.015 degrees, and measurement time of 48 second/step in a diffraction angle 2θ range of 5 to 40 degrees by using Bruker AXS D8 ADVANCE.

TABLE 6

| RS-Trolox•R-PEA | | | R-Trolox•R-PEA | | | R-Trolox•R-PEA•NMP | | |
|---|---|---|---|---|---|---|---|---|
| 2θ | d Value | Gross Intensity | 2θ | d Value | Gross Intensity | 2θ | d Value | Gross Intensity |
| 8.54 | 10.35 | 1964 | 6.75 | 13.08 | 17089 | 5.30 | 16.65 | 16540 |
| 10.89 | 8.12 | 153 | 7.19 | 12.29 | 2153 | 7.69 | 11.49 | 2385 |
| 11.87 | 7.45 | 647 | 9.86 | 8.97 | 3892 | 8.94 | 9.89 | 11334 |
| 12.31 | 7.18 | 694 | 13.49 | 6.56 | 1462 | 10.55 | 8.38 | 4723 |
| 12.55 | 7.05 | 1791 | 14.37 | 6.16 | 7065 | 11.51 | 7.68 | 215 |
| 13.45 | 6.58 | 9565 | 14.67 | 6.03 | 2080 | 12.78 | 6.92 | 1939 |
| 15.41 | 5.75 | 1980 | 15.29 | 5.79 | 3941 | 14.41 | 6.14 | 3846 |
| 17.11 | 5.18 | 2378 | 16.34 | 5.42 | 686 | 14.64 | 6.04 | 707 |
| 18.87 | 4.70 | 4647 | 17.51 | 5.06 | 1286 | 15.04 | 5.89 | 6968 |
| 19.67 | 4.51 | 504 | 18.94 | 4.68 | 701 | 15.35 | 5.77 | 5169 |
| 20.36 | 4.36 | 463 | 19.73 | 4.50 | 984 | 15.83 | 5.60 | 7505 |
| 21.00 | 4.23 | 4405 | 20.58 | 4.31 | 891 | 16.44 | 5.39 | 394 |
| 21.56 | 4.12 | 511 | 21.51 | 4.13 | 5716 | 17.44 | 5.08 | 398 |
| 22.19 | 4.00 | 2003 | 22.14 | 4.01 | 1027 | 17.75 | 4.99 | 944 |
| 22.57 | 3.94 | 1247 | 22.71 | 3.91 | 2054 | 17.86 | 4.96 | 2724 |
| 23.03 | 3.86 | 621 | 23.31 | 3.81 | 1610 | 19.07 | 4.65 | 471 |
| 23.83 | 3.73 | 1706 | 24.93 | 3.57 | 541 | 19.56 | 4.54 | 3794 |
| 24.69 | 3.60 | 615 | 25.49 | 3.49 | 1252 | 20.20 | 4.39 | 367 |
| 25.26 | 3.52 | 410 | 26.20 | 3.40 | 732 | 20.67 | 4.29 | 328 |
| 25.81 | 3.45 | 826 | 26.49 | 3.36 | 449 | 21.14 | 4.20 | 1131 |
| 26.43 | 3.37 | 532 | 27.10 | 3.29 | 1849 | 21.43 | 4.14 | 677 |
| 26.96 | 3.31 | 329 | 27.76 | 3.21 | 759 | 21.72 | 4.09 | 980 |
| 28.32 | 3.15 | 562 | 28.03 | 3.18 | 1726 | 22.34 | 3.98 | 10312 |
| 29.06 | 3.07 | 317 | 28.68 | 3.11 | 856 | 22.82 | 3.89 | 945 |
| 30.07 | 2.97 | 424 | 29.55 | 3.02 | 203 | 23.29 | 3.82 | 411 |
| 30.53 | 2.93 | 688 | 29.67 | 3.01 | 228 | 24.15 | 3.68 | 764 |
| 31.07 | 2.88 | 224 | 31.16 | 2.87 | 292 | 24.38 | 3.65 | 447 |
| 31.53 | 2.84 | 447 | 31.36 | 2.85 | 495 | 25.43 | 3.50 | 2315 |
| 32.02 | 2.79 | 261 | 31.97 | 2.80 | 232 | 25.61 | 3.48 | 1363 |
| 32.39 | 2.76 | 455 | 32.59 | 2.75 | 227 | 26.48 | 3.36 | 3365 |
| 33.32 | 2.69 | 151 | 34.01 | 2.63 | 564 | 26.92 | 3.31 | 760 |
| 33.67 | 2.66 | 155 | 34.69 | 2.58 | 541 | 27.10 | 3.29 | 490 |
| 34.08 | 2.63 | 560 | 34.76 | 2.58 | 496 | 27.47 | 3.24 | 1720 |
| 34.54 | 2.59 | 206 | 35.45 | 2.53 | 423 | 28.01 | 3.18 | 514 |
| 35.41 | 2.53 | 280 | 36.19 | 2.48 | 263 | 28.69 | 3.11 | 517 |
| 35.85 | 2.50 | 175 | 36.73 | 2.45 | 339 | 29.16 | 3.06 | 359 |
| 36.28 | 2.47 | 220 | 36.97 | 2.43 | 241 | 29.47 | 3.03 | 336 |
| 37.33 | 2.41 | 446 | 38.85 | 2.32 | 172 | 30.20 | 2.96 | 361 |
| 38.23 | 2.35 | 236 | 39.37 | 2.29 | 238 | 30.99 | 2.88 | 364 |
| 39.26 | 2.29 | 265 | | | | 31.38 | 2.85 | 421 |
| | | | | | | 31.90 | 2.80 | 382 |
| | | | | | | 32.46 | 2.76 | 263 |
| | | | | | | 32.78 | 2.73 | 264 |
| | | | | | | 33.22 | 2.69 | 309 |
| | | | | | | 33.63 | 2.66 | 470 |
| | | | | | | 34.11 | 2.63 | 236 |
| | | | | | | 34.43 | 2.60 | 252 |
| | | | | | | 35.06 | 2.56 | 306 |
| | | | | | | 35.41 | 2.53 | 318 |
| | | | | | | 35.79 | 2.51 | 349 |
| | | | | | | 36.14 | 2.48 | 310 |
| | | | | | | 37.40 | 2.40 | 494 |
| | | | | | | 38.07 | 2.36 | 361 |
| | | | | | | 38.86 | 2.32 | 389 |
| | | | | | | 39.26 | 2.29 | 239 |

Example 12

Double Crystallization Using DMP/Toluene Mixture Solvent (First Step: Optical Resolution, Second Step: Recrystallization)

At room temperature, DMP (50.0 g) and toluene (200.0 g) were added to Trolox (25.00 g), and the temperature was raised to 50° C. R-PEA (7.26 g) was added, and the solution was cooled to 45° C., and then an R-Trolox•R-PEA (0.03 g) seed crystal was seeded and incubated for 2 hour. After adding R-PEA (3.03 g) dropwise over 20 minutes, the mixture was incubated for 40 minutes. After cooling the mixture to 5° C., the precipitate was filtered out. The precipitate was washed twice with a DMP/toluene mixture solvent (10.0 g/40.0 g), washed twice with toluene (50 g), and then dried to obtain a DMP solvate of R-Trolox•R-PEA (yield: 19.32 g, percentage yield 40.9%, optical purity: 94.7% ee).

To the crystal obtained above (18.00 g), DMP (54.0 g) and toluene (162.0 g) were added, and the temperature was raised to 80° C. The solution was then cooled to 70° C., and an R-Trolox•R-PEA (0.02 g) was seeded and incubated for 1 hour, and cooled to 5° C., and then the precipitate was filtered out. The precipitate was washed with a DMP/toluene mixture solvent (6.8 g/20.3 g), washed twice with toluene (27.0 g), and then dried to obtain a DMP solvate of R-Trolox•R-PEA (yield: 16.82 g, percentage yield 93.4%, optical purity: 99.9% ee).

Example 13

Optical resolution for obtaining S-Trolox•S-PEA•NMP

At room temperature, NMP (50.00 g) and toluene (200.0 g) were added to Trolox (25.00 g), and the temperature was raised to 50° C. S-PEA (7.26 g) was added. The mixture was cooled to 45° C., then an S-Trolox•S-PEA (0.03 g) seed crystal was seeded and incubated for 2 hours. After adding S-PEA (3.03 g) dropwise over 30 minutes, the mixture was incubated for 2 hours. The mixture was cooled to 0° C. and incubated overnight, and then the precipitate was filtered out. The precipitate was washed twice with an NMP/toluene mixture solvent (10.0 g/40.0 g), washed twice with toluene (50 g), and then dried to obtain an NMP solvate of S-Trolox. S-PEA (yield: 19.32 g, percentage yield 41.1%, optical purity: 97.0% ee).

Example 14A

Preparation of (R)-6-hydroxy-2,5,7,8-tetramethyl-chroman-2-carboxylic acid

[Chemical Formula 33]

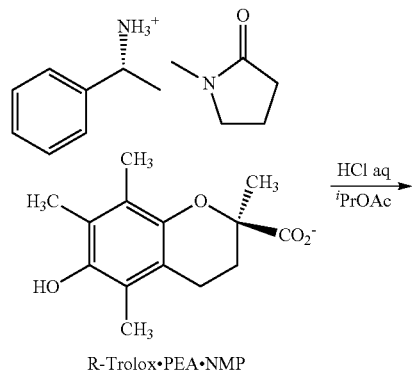

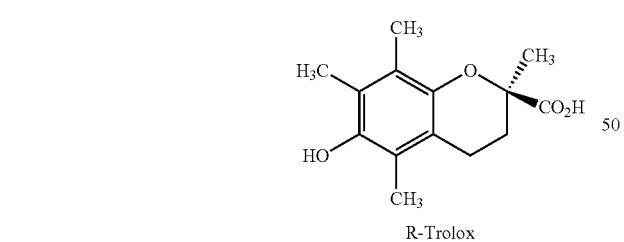

After adding isopropyl acetate (110 kg) and water (10.99 kg) to R-Trolox. PEA. NMP (10.00 kg, 21.25 mol), 35% hydrochloric acid (3.80 kg, 36.55 mol) was added dropwise and stirred for 20 minutes at 25±5° C. After the mixture was left standing and separated, the organic layer was washed twice with water (15.80 kg, 15.83 kg) and concentrated under reduced pressure at 45° C. or lower (amount recovered: 92.0 kg). Isopropyl acetate (8.38 kg) was added to prepare an isopropyl acetate solution of R-Trolox (16.7%, 31.9 kg). This was used in the following step (assuming yield of 100%).

Example 14B

Preparation of (R)-6-hydroxy-2,5,7,8-tetramethyl-chroman-2-carboxylic acid

[Chemical Formula 34]

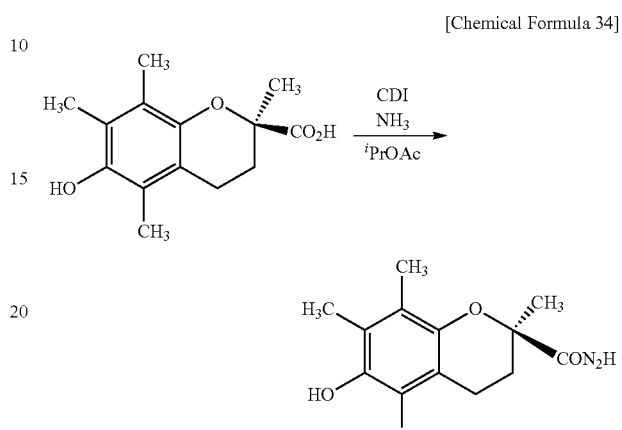

An isopropyl acetate solution of R-Trolox (16.7%, 31.8 kg, 21.25 mol (assumed)) was added dropwise into a slurry of isopropyl acetate (26.6 kg) added with CDI (Hodogaya Chemical) (8.61 kg, 52.12 mol) over 1 hour at 20±5° C. The mixture was washed with isopropyl acetate (2.94 kg) and incubated for 2 hours. While the temperature was maintained at less than 15±5° C., the isopropyl acetate solution was added dropwise into 28% ammonium water (Nacalai Tesque, 16.15 kg, 265.61 mol) that had been precooled to 15±5° C. over an hour. The mixture was washed with isopropyl acetate (1.33 kg). After stirring for 1.5 hours, isopropyl acetate (43.5 kg) and water (21.27 kg) were added. An aqueous phosphoric acid solution prepared by mixing water (10.64 kg) and 85% phosphoric acid (19.60 kg) was added dropwise at 10 to 60° C. The mixture was washed with water (1.06 kg) and separated to obtain an isopropyl acetate solution (109.09 kg) of the title compound, which was used in the following step (assuming yield of 100%).

Example 14C

Preparation of (R)-2-hydroxy-2-methyl-4-(2,4,5-trimethyl-3,6-dioxocyclohexa-1,4-dienyl) butanamide

[Chemical Formula 35]

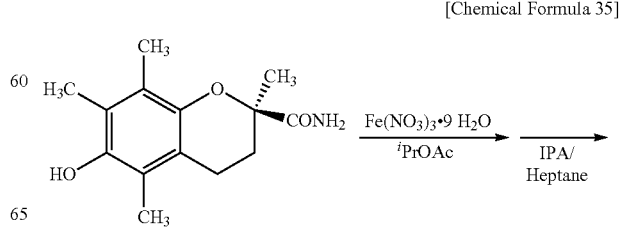

-continued

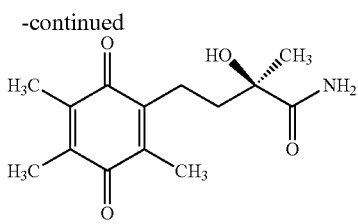

An aqueous 33.9% ferric nitrate solution (Kokusan Chemical) (33.64 kg, 48.66 mol) was added dropwise into an isopropyl acetate solution of (R)-6-hydroxy-2,5,7,8-tetramethylchroman-2-carboxylic acid (109.58 kg, 21.25 mol (assumed)) over one hour at 30° C. or less. The mixture was incubated for 2.5 hours at 25±5° C., then added with salt (3.71 kg), stirred for 15 minutes, and left standing. After separation, the mixture was heated to 40±5° C., added with aqueous 12.1% citric acid solution (13.52 kg), and washed. After further adding an aqueous 10% sodium carbonate solution (13.24 kg) and washing, the mixture was washed with water (10.60 kg). The organic layer obtained by separation was concentrated under reduced pressure at 45° C. or less (amount recovered: 52.7 kg). After raising the temperature to 80±5° C. and incubating for 1 hour, a seed crystal (0.003 kg) was added and incubated for 1 hour. After cooling to 0° C. at a cooling rate of 10° C./hour and incubating for 11 hours, the precipitate was filtered out and washed twice with precooled isopropyl acetate (13.24 kg×2). The precipitate was aerated and dried with nitrogen at 45° C. or less to obtain a crude crystal (yield: 4.47 kg, percentage yield of 3 steps: 79.3%, quality: 100.00%, optical purity: >99.9% ee).

The resulting crude crystal (4.01 kg) was recrystallized with an isopropanol/heptane mixture solvent to obtain the title compound (3.77 kg, recrystallization yield: 94.0%, quality: 100.00%, optical purity: >99.9% ee).

As described above, the present disclosure is exemplified by the use of its preferred embodiments. It is understood that the scope of the present disclosure should be interpreted solely based on the Claims. The present application claims priority to Japanese Patent Application No. 2020-28614 (filed on Feb. 21, 2020). It is understood that the entire content thereof is incorporated herein by reference. It is also understood that any patent, any patent application, and any references cited herein should be incorporated herein by reference in the same manner as the contents are specifically described herein.

INDUSTRIAL APPLICABILITY

The present disclosure is useful for the manufacture of an optically active medicament.

The invention claimed is:

1. A method of optically resolving a compound of formula I or a compound of formula II, comprising adding an amide-based solvent to a mixture of the compound of formula I and the compound of formula II:

[Chemical Formula 9]

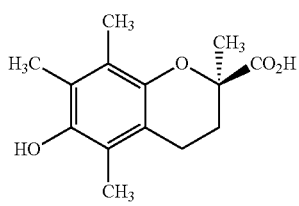

Formula I: (R)-6-hydroxy-2,5,7,8-tetramethylchroman-2-carboxylic acid (hereinafter R Trolox)

[Chemical Formula 10]

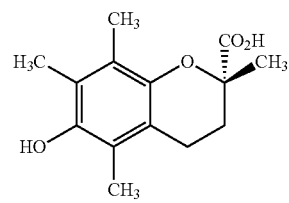

Formula II: (S)-6-hydroxy-2,5,7,8-tetramethylchroman-2-carboxylic acid (hereinafter S Trolox).

2. The method of claim 1, wherein an optical resolving agent is added to the compound.

3. The method of claim 2, wherein the optical resolving agent is added to the compound after the addition of the amide-based solvent.

4. The method of claim 2, wherein the optical resolving agent is added to the compound at the same as the addition of the amide-based solvent.

5. The method of claim 2, wherein the optical resolving agent is added to the compound before the addition of the amide-based solvent.

6. The method of claim 1, wherein an optical resolving agent is used in combination with the amide-based solvent.

7. The method of claim 2, wherein the optical resolving agent itself has optical activity.

8. The method of claim 2, wherein the optical resolving agent is selected from phenylethylamine, N-methylglucamine, arginine, lysine, pseudoephedrine, leucinol, and aminophenyl propanol.

9. The method of claim 2, wherein the optical resolving agent is (R)-phenylethylamine or(S)-phenylethylamine.

10. The method of claim 2, wherein the optical resolving agent is (R)-phenylethylamine.

11. The method of claim 1, wherein the amide-based solvent is one or more solvents selected from N-methylpyrrolidone (NMP), dimethylacetamide (DMA), and N,N-dimethylformamide (DMF).

12. The method of claim 11, wherein the amide-based solvent is N-methylpyrrolidone.

13. The method of claim 1, wherein a solid salt of the compound of formula I is manufactured, and wherein the method comprises adding the amide-based solvent in the presence of an optical resolving agent

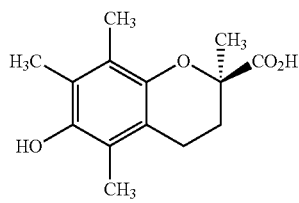 [SMILES: Cc1c(C)c2c(c(C)c1O)CC[C@](C)(C(=O)O)O2]

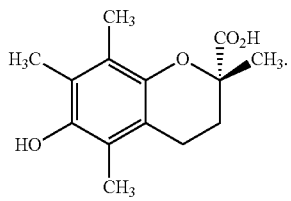 [SMILES: Cc1c(C)c2c(c(C)c1O)CC[C@@](C)(C(=O)O)O2]

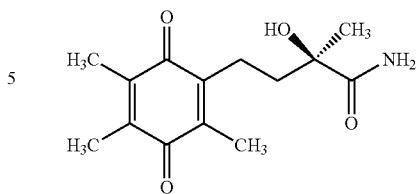

14. The method of claim 13, wherein the optical resolving agent comprises at least an asymmetric carbon, and a moiety that can form a salt with the R Trolox or S Trolox.

15. The method of claim 13, comprising adding the optical resolving agent to the sample.

16. The method of claim 13, wherein addition of the amide-based solvent comprises adding a mixture of the optical resolving agent and the amide-based solvent to the sample.

17. The method of claim 13, wherein the sample comprises a complex with the optical resolving agent.

18. The method of claim 13, wherein the sample comprises a mixture of a compound of formula I and a compound of formula II.

19. The method of claim 13, wherein the optical resolving agent is selected from phenylethylamine, N-methylglucamine, arginine, lysine, pseudoephedrine, leucinol, and aminophenyl propanol.

20. The method of claim 13, wherein the optical resolving agent is phenylethylamine.

21. The method of claim 13, wherein the amide-based solvent is one or more solvents selected from N-methylpyrrolidone (NMP), dimethylacetamide (DMA), N,N-dimethylformamide (DMF), N,N-diethylformamide (DEF), tetramethylurea (TMU), and hexamethylphosphoric triamide (HMPA).

22. The method of claim 21, wherein the amide-based solvent is N-methylpyrrolidone.

23. The method of claim 19, wherein the phenylethylamine is (R)-phenylethylamine.

24. The method of claim 13, wherein the solid salt is an R-phenylethylamine salt.

25. The method of claim 13, wherein the solid salt is an amide-based solvate.

26. The method of claim 25, wherein the amide-based solvent is one or more solvents selected from N-methylpyrrolidone (NMP), dimethylacetamide (DMA), and N,N-dimethylformamide (DMF).

27. The method of claim 26, wherein the amide-based solvent is N-methylpyrrolidone.

28. The method of claim 13, wherein an enantiomeric excess of a manufactured solid salt of a compound of formula I is at least 98% or greater.

29. The method of claim 13, wherein an enantiomeric excess of a manufactured solid salt of a compound of formula I is at least 99% or greater.

30. The method of claim 13, further comprising dissolving the phenylethylamine into toluene.

31. The method of claim 13, comprising adding a poor solvent to the sample.

32. The method of claim 23, wherein the poor solvent is toluene or ethyl acetate.

33. The method of claim 13, further comprising removing the amide-based solvent.

34. The method of claim 13, further comprising converting the solid salt of the compound of formula I into a compound of formula IIIa:

Formula IIIa: (R)-2-hydroxy-2-methyl-4-(2,4,5-trimethyl-3,6-dioxocyclohexa-1,4-dienyl) butanamide.

35. The method of claim 1, wherein a solid salt of the compound of formula II is manufactured, and wherein the method comprises adding the amide-based solvent in the presence of an optical resolving agent

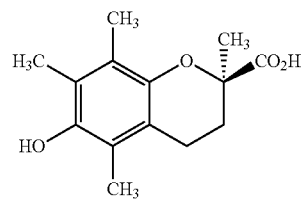

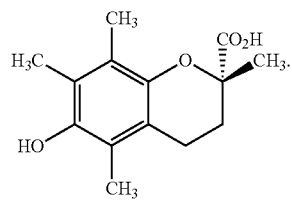

36. The method of claim 35, wherein the optical resolving agent comprises at least an asymmetric carbon, and a moiety that can form a salt with the R Trolox or S Trolox.

37. The method of claim 35, comprising adding the optical resolving agent to the sample.

38. The method of claim 35, wherein addition of the amide-based solvent comprises adding a mixture of the optical resolving agent and the amide-based solvent to the sample.

39. The method of claim 35, wherein the sample comprises a complex with the optical resolving agent.

40. The method of claim 35, wherein the sample comprises a mixture of a compound of formula I and a compound of formula II.

41. The method of claim 35, wherein the optical resolving agent is selected from phenylethylamine, N-methylglucamine, arginine, lysine, pseudoephedrine, leucinol, and aminophenyl propanol.

42. The method of claim 35, wherein the optical resolving agent is phenylethylamine.

43. The method of claim 35, wherein the amide-based solvent is one or more solvents selected from N-methylpyrrolidone (NMP), dimethylacetamide (DMA), and N,N-dimethylformamide (DMF).

44. The method of claim 43, wherein the amide-based solvent is N-methylpyrrolidone.

45. The method of claim 41, wherein the phenylethylamine is (S)-phenylethylamine.

46. The method of claim 35, wherein the solid salt is an S-phenylethylamine salt.

47. The method of claim 35, wherein the solid salt is an amide-based solvate.

48. The method of claim 35, wherein the amide-based solvent is one or more solvents selected from N-methylpyrrolidone (NMP), dimethylacetamide (DMA), and N,N-dimethylformamide (DMF).

49. The method of claim 48, wherein the amide-based solvent is N-methylpyrrolidone.

50. The method of claim 35, wherein an enantiomeric excess of a manufactured solid salt of a compound of formula II is at least 98% or greater.

51. The method of claim 35, wherein an enantiomeric excess of a manufactured solid salt of a compound of formula II is at least 99% or greater.

52. The method of claim 35, further comprising dissolving phenylethylamine into toluene.

53. The method of claim 35, comprising adding a poor solvent.

54. The method of claim 53, wherein the poor solvent is toluene or ethyl acetate.

55. The method of claim 35, further comprising removing the amide-based solvent.

56. The method of claim 13, further comprising converting the solid salt of the compound of formula II into a compound of formula IIIb:

[Chemical Formula 7]

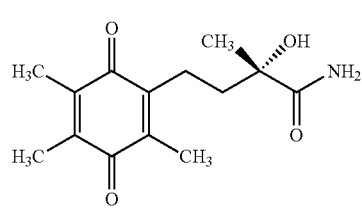

Formula IIIb: (S)-2-hydroxy-2-methyl-4-(2,4,5-trimethyl-3,6-dioxocyclohexa-1,4-dienyl)butanamide.

* * * * *